United States Patent
Yanai

(10) Patent No.: US 9,168,757 B2
(45) Date of Patent: Oct. 27, 2015

(54) IMAGE PROCESSING APPARATUS AND IMAGE PROCESSING METHOD

(71) Applicant: CANON KABUSHIKI KAISHA, Tokyo (JP)

(72) Inventor: Tomokazu Yanai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/335,754

(22) Filed: Jul. 18, 2014

(65) Prior Publication Data

US 2015/0054874 A1    Feb. 26, 2015

(30) Foreign Application Priority Data

Aug. 22, 2013  (JP) .................. 2013-172665

(51) Int. Cl.
   *B41J 29/38*   (2006.01)
   *B41J 2/21*    (2006.01)

(52) U.S. Cl.
   CPC ..................... *B41J 2/2114* (2013.01)

(58) Field of Classification Search
   CPC ..................................... B41J 2/2114
   USPC ............................................ 347/14
   See application file for complete search history.

(56) References Cited

U.S. PATENT DOCUMENTS

| | | | | |
|---|---|---|---|---|
| 5,867,607 A * | 2/1999 | Shibuya et al. | ............ | 358/1.9 |
| 5,923,774 A * | 7/1999 | Ostromoukhov | ............ | 382/162 |
| 7,286,266 B2 * | 10/2007 | Fujita | ............ | 358/3.06 |
| 7,495,798 B2 * | 2/2009 | Kakutani | ............ | 358/1.9 |
| 8,482,798 B2 | 7/2013 | Taya et al. | | |
| 8,651,609 B2 * | 2/2014 | Oya | ............ | 347/15 |
| 2010/0296751 A1 | 11/2010 | Yanai | | |
| 2012/0050365 A1 * | 3/2012 | Konno et al. | ............ | 347/14 |
| 2012/0113448 A1 | 5/2012 | Moribe | | |
| 2012/0287190 A1 * | 11/2012 | Shimada | ............ | 347/12 |
| 2012/0313992 A1 * | 12/2012 | Wada et al. | ............ | 347/15 |
| 2013/0128291 A1 * | 5/2013 | Shibasaki et al. | ............ | 358/1.9 |
| 2013/0300788 A1 * | 11/2013 | Konno et al. | ............ | 347/9 |

FOREIGN PATENT DOCUMENTS

JP   2011-025658 A   2/2011
JP   2012-085123 A   4/2012

* cited by examiner

*Primary Examiner* — Jannelle M Lebron
*Assistant Examiner* — Jeremy Bishop
(74) *Attorney, Agent, or Firm* — Fitzpatrick, Cella, Harper & Scinto

(57) ABSTRACT

Color separation processing is performed on the input image data to generate material amount data representing the recording amount of each recording material. Halftone processing of generating binary data for each recording scan in an image recording apparatus is performed based on the material amount data. A discharge of a colored material in a first recording scan of recording the colored material and a discharge of a high transmissivity material in a second recording scan of recording the high transmissivity material are represented by the binary data for each recording scan. The high transmissivity material is recorded at a predetermined thickness on a recording layer of the colored material after the first recording scan.

19 Claims, 22 Drawing Sheets

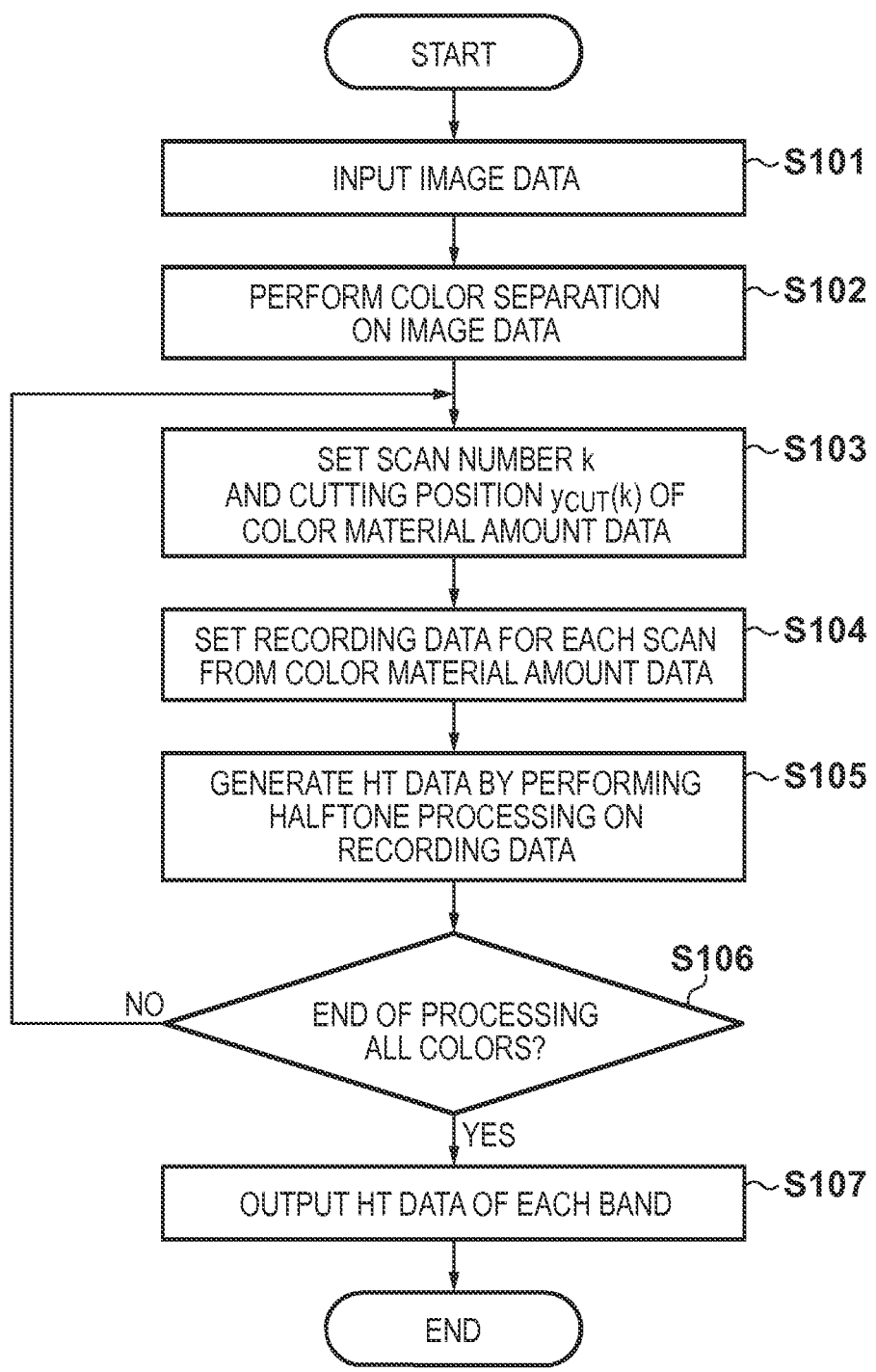

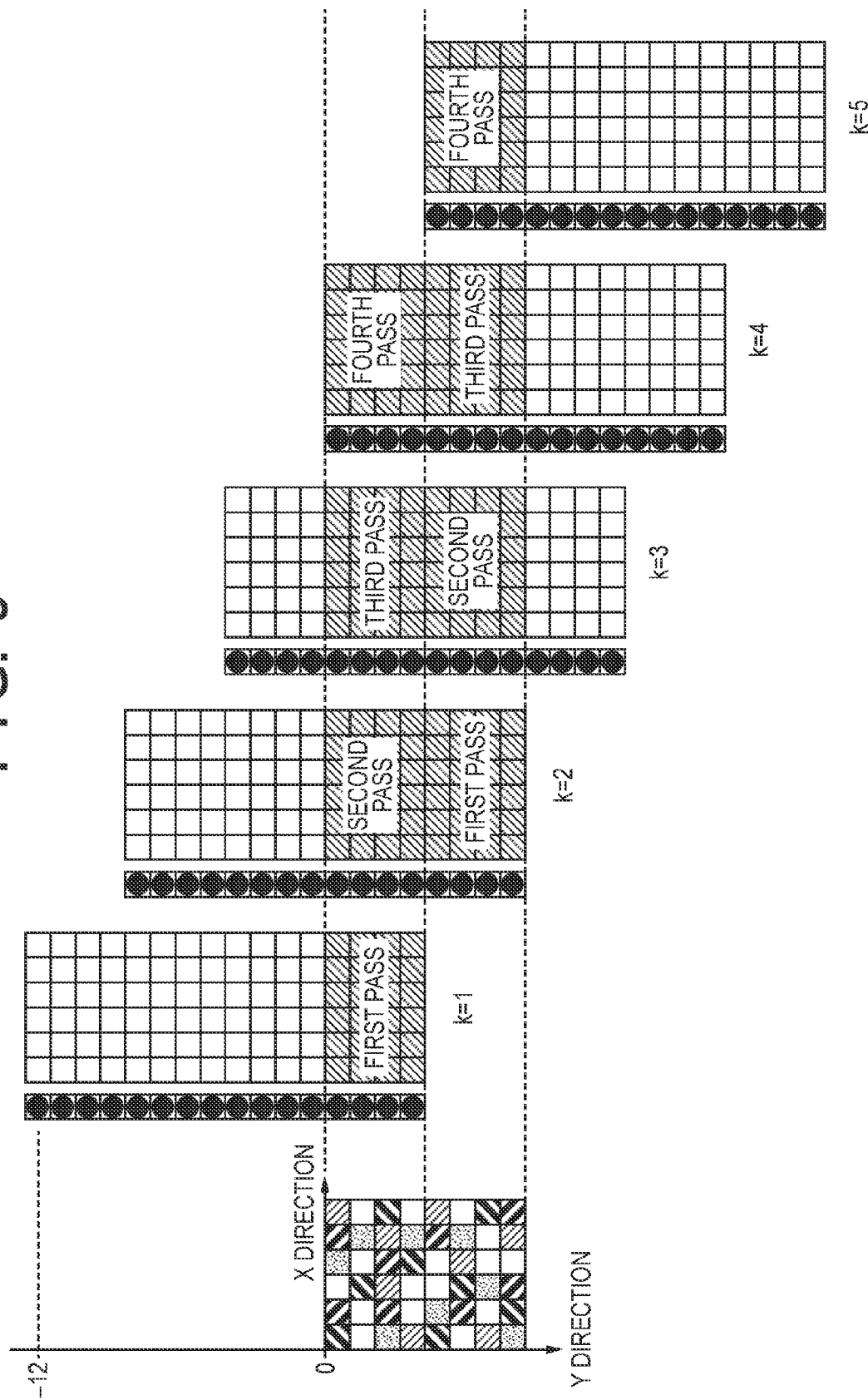

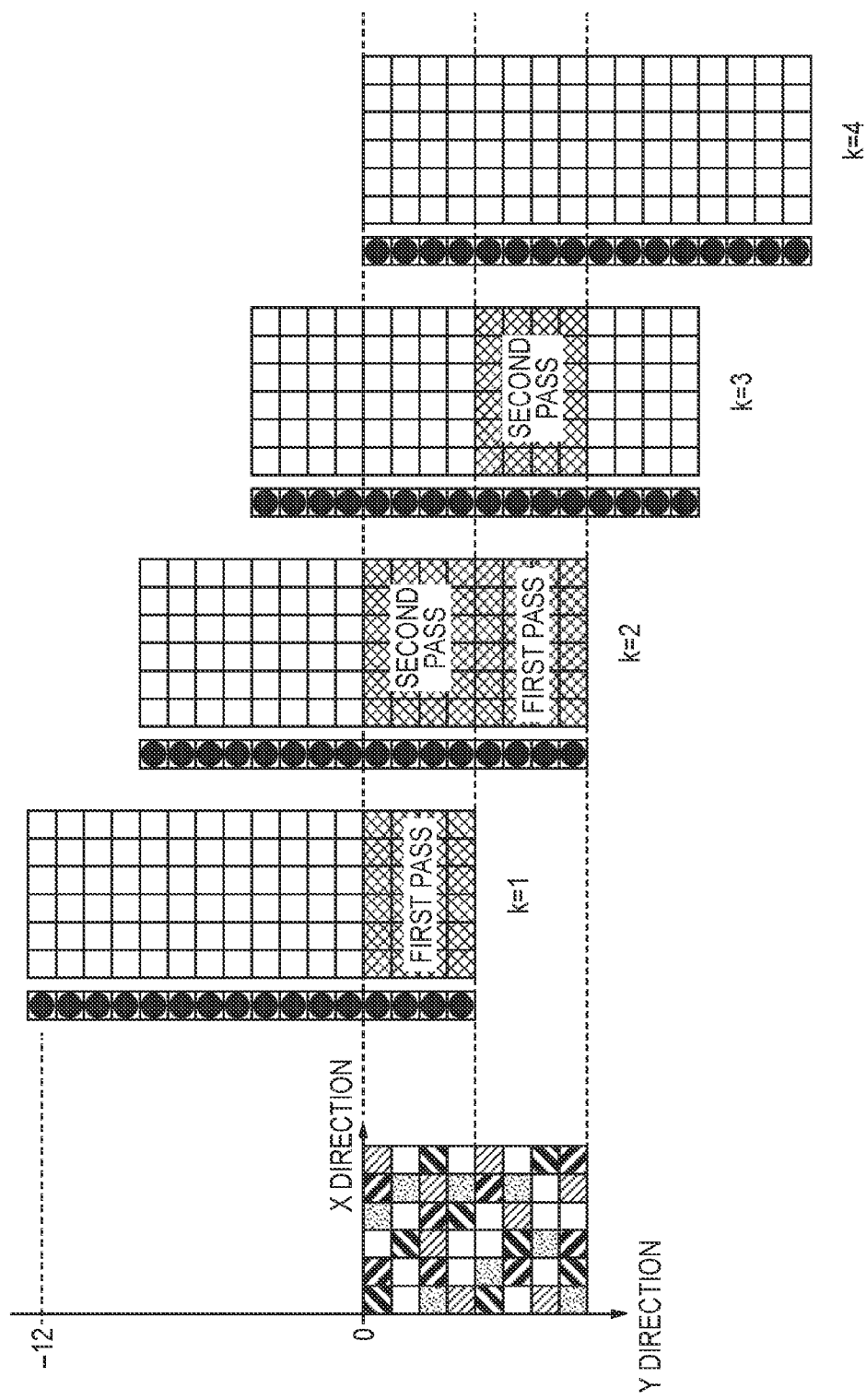

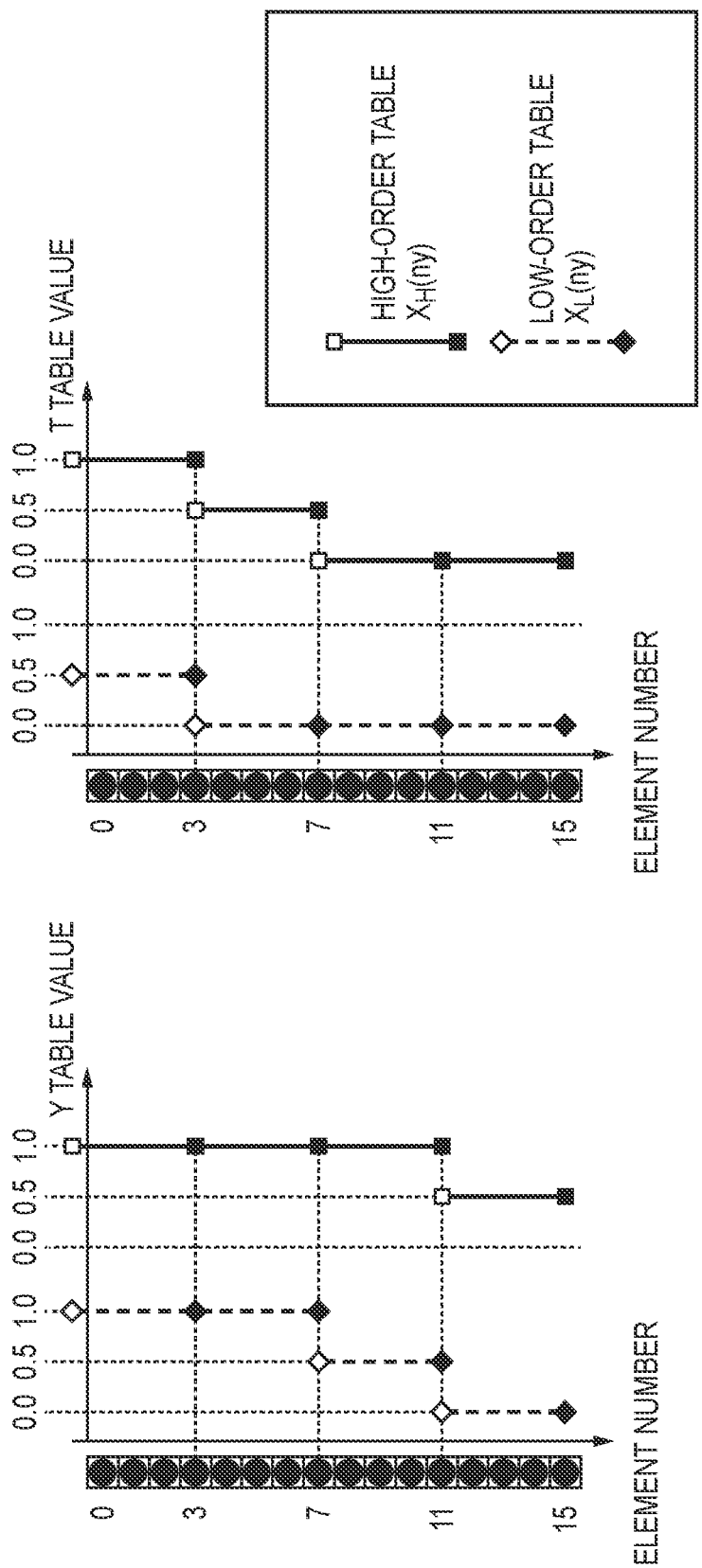

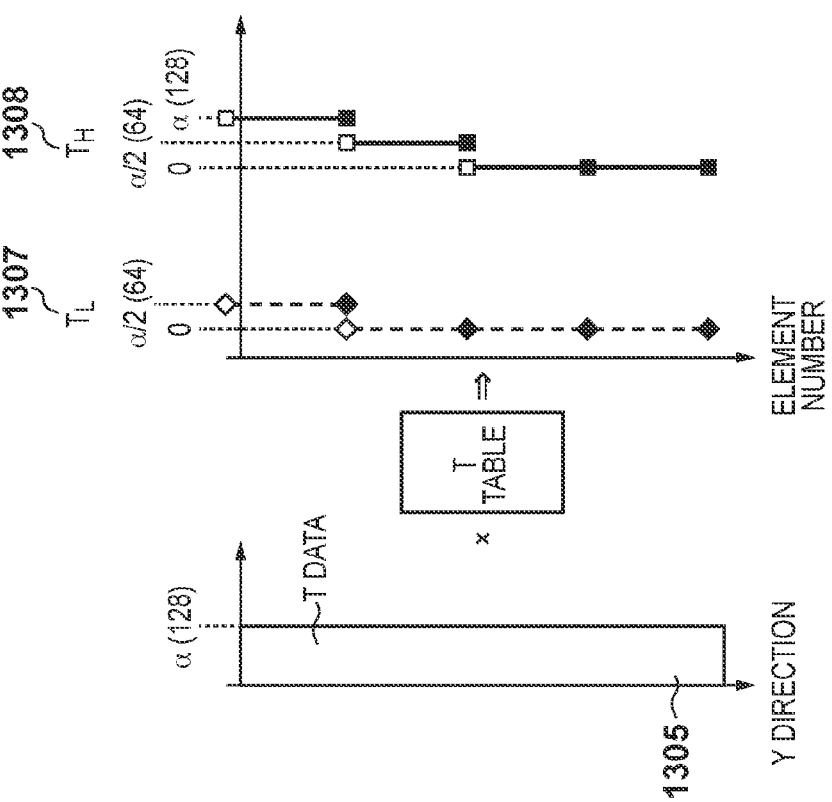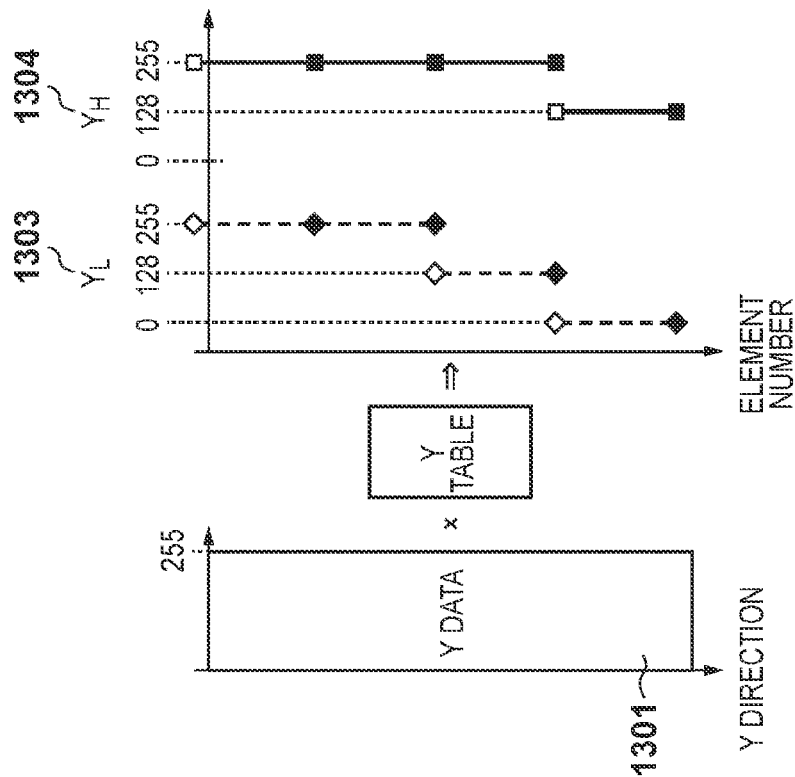

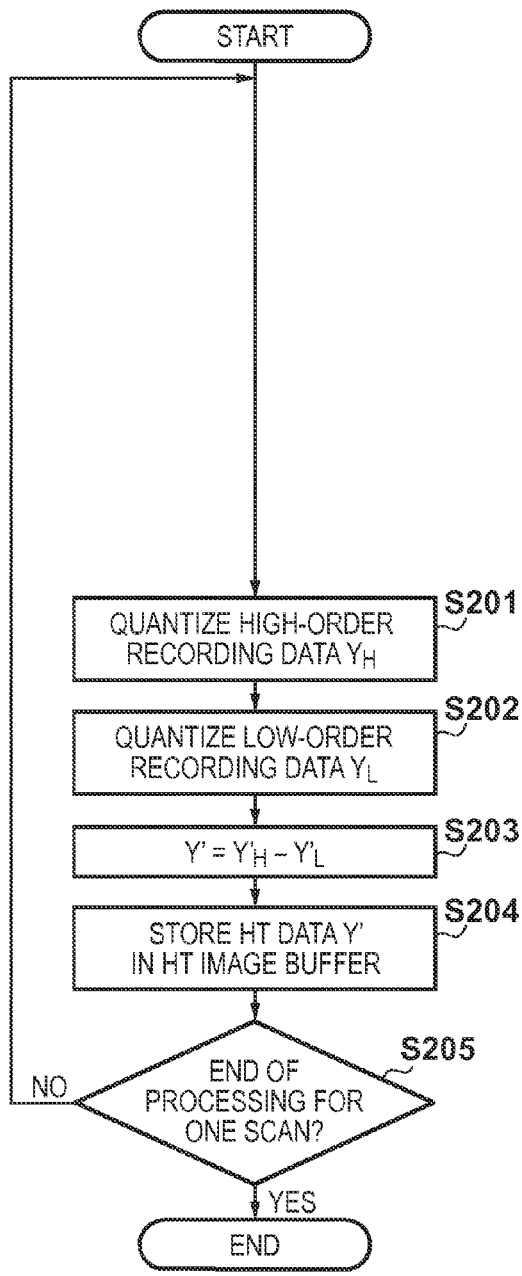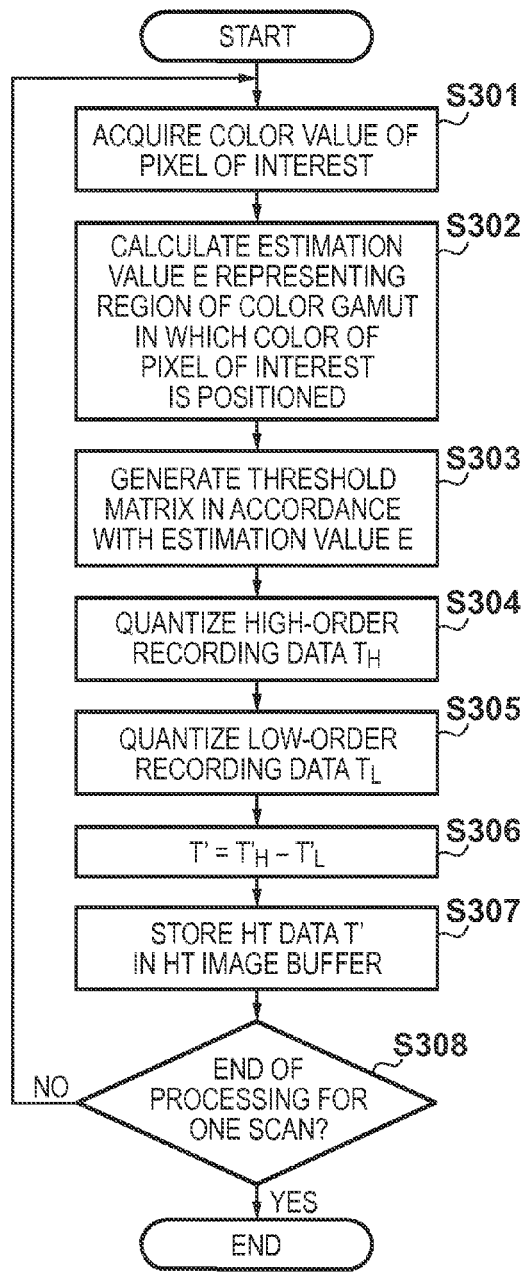

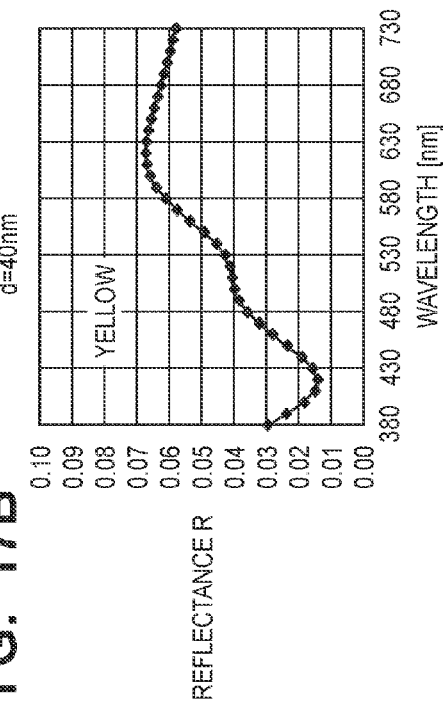
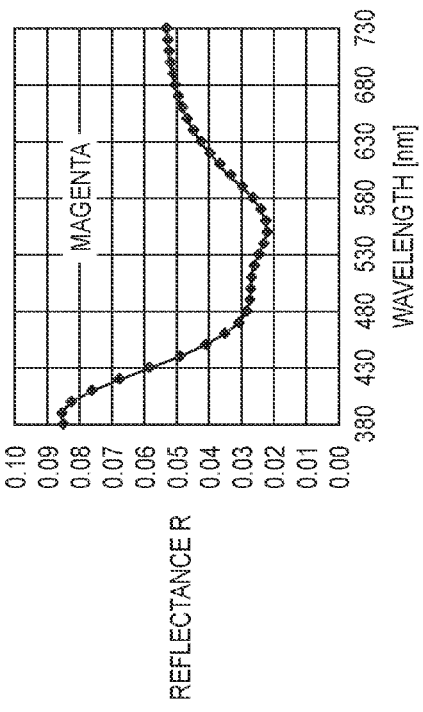
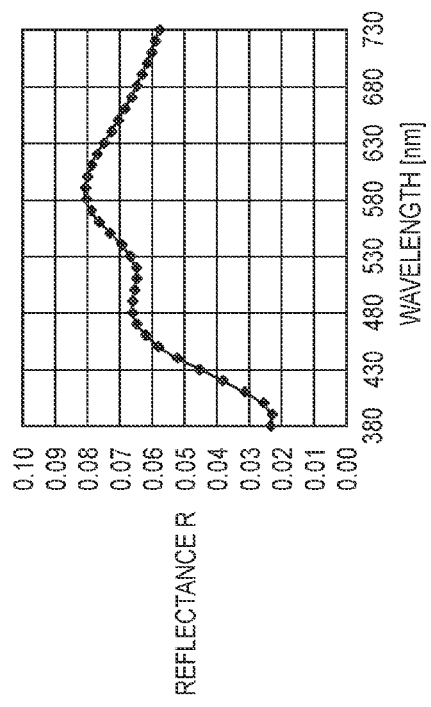
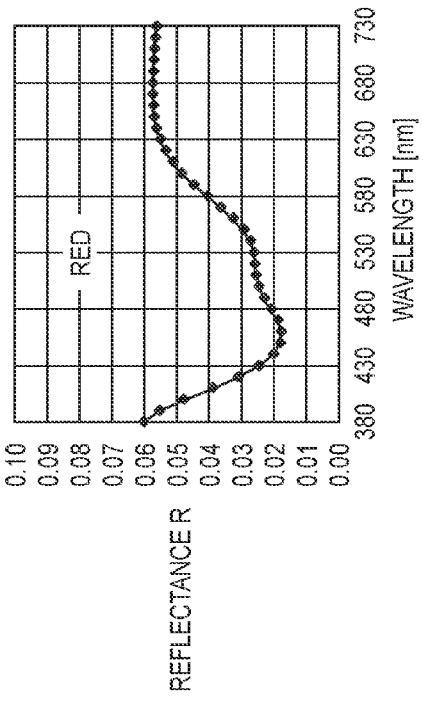

FIG. 18

DOT DISPERSION

DOT CONCENTRATION

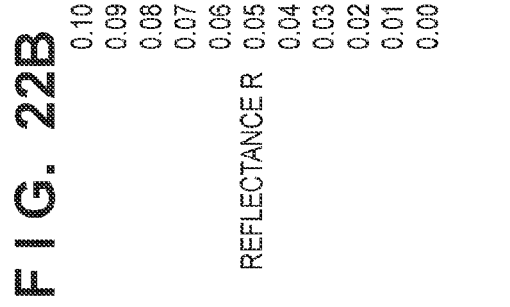
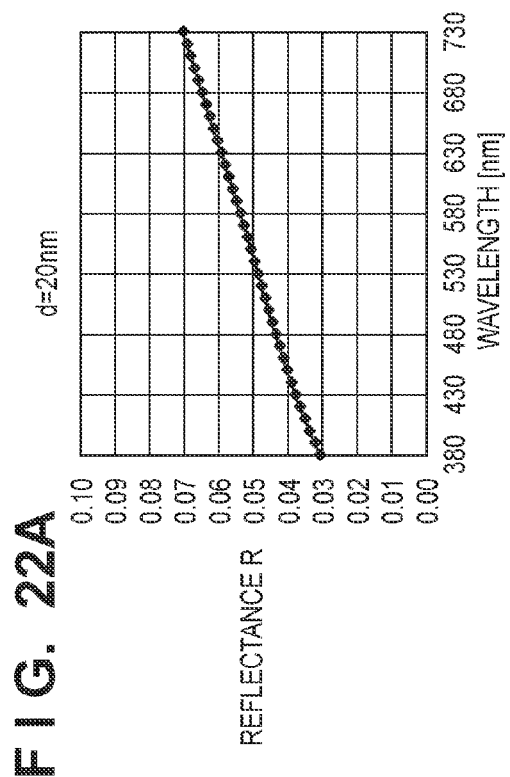
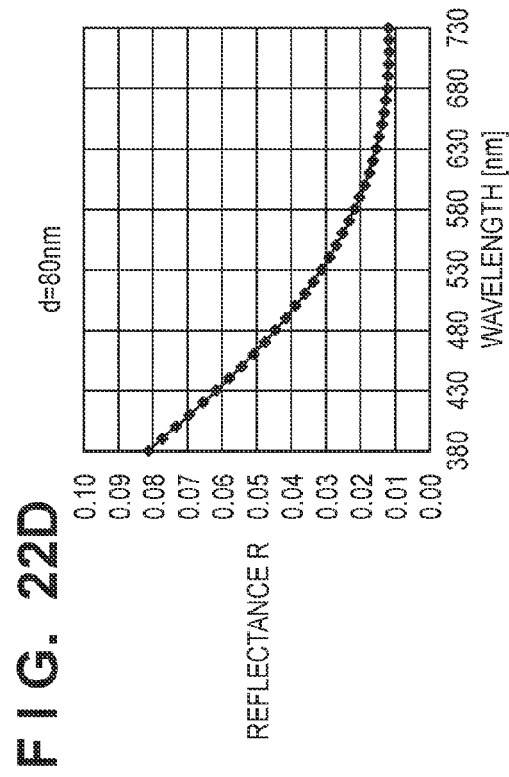
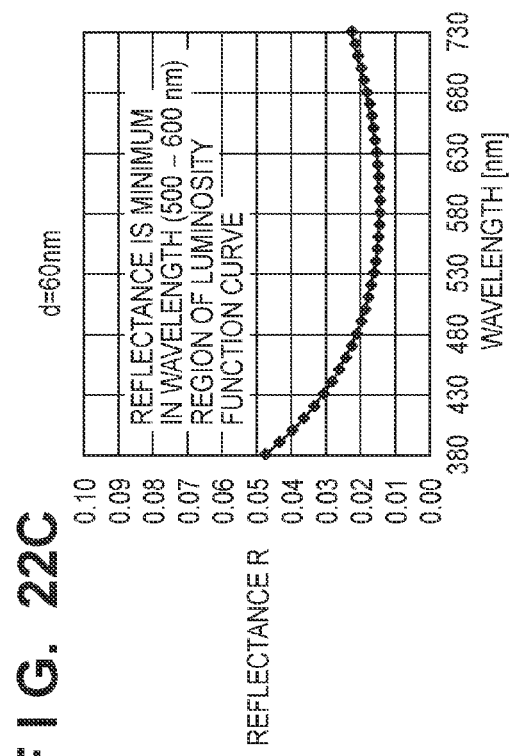

IMAGE PROCESSING APPARATUS AND IMAGE PROCESSING METHOD

BACKGROUND OF THE INVENTION

1. Field of the Invention

The present invention relates to an image processing apparatus and image processing method for generating image data for image recording using, as recording materials, a colored material and a high transmissivity material higher in transmittance than the colored material.

2. Description of the Related Art

An inkjet recording method is known as a typical example in a recording apparatus which records information such as a character or image on a sheet-like recording medium such as recording paper or film. Recently, various recording materials have been proposed in recording apparatuses employing the inkjet recording method. Typical examples are dye ink and pigment ink.

The color material of the dye ink exists as a very small molecule in a recording material. When the dye ink is used in the inkjet recording method, the color material penetrates into a recording medium and is fixed. When the second color material is applied a short time after the first color material is fixed in a recording medium, the second color material is fixed in the recording medium in a state in which it is mixed with the previously fixed first color material.

The color material of the pigment ink exists as a particle of about several ten nm in a recording material. The pigment ink whose color material exists as a particle is almost free from decomposition of the color material by light and dissolution into water. The pigment ink is superior to the dye ink in the weather resistance and water resistance of a character and image.

When the pigment ink is used in the inkjet recording method, the color material hardly penetrates into a recording medium and is fixed on the surface of the recording medium because the particle size of the color material is large. When the second color material is applied a short time after the first color material is fixed on the surface of a recording medium, the second color material is fixed on the previously fixed first color material. That is, for the pigment ink, color materials form recording layers in the recording order. Hence, there has been proposed a technique of obtaining the decorative effect of an image by controlling the recording order of pigment inks (Japanese Patent Laid-Open No. 2012-085123: to be referred to as "literature 1" hereinafter).

According to the technique in literature 1, a color material (colorless material) having a relatively high transmittance is fixed on an upper layer with respect to a color material (colored material) which is arranged on a relatively lower layer and has a relatively low transmittance. The colorless material fixed on the upper layer forms an optical thin film. By controlling the thickness of the colorless material, various colors (structural colors) by thin film interference are reproduced. The technique in literature 1 exploits the fact that the structural color is different from the color of a colored material on a lower layer. By controlling the thickness of a colorless material on an upper layer, a desired color image is formed to obtain the decorative/decorating effect.

The method in literature 1 utilizes thin film interference for the decorative/decorating effect of an image, but does not use it for improvement of the quality of an image.

SUMMARY OF THE INVENTION

In one aspect, an image processing apparatus for generating image data for image recording using, as recording materials, a colored material and a high transmissivity material higher in transmittance than the colored material, comprising: a color separation unit configured to perform color separation processing on input image data so as to generate material amount data representing a recording amount of each recoding material; and a generation unit configured to perform halftone processing of generating binary data for each recording scan in an image recording apparatus based on the material amount data, wherein a discharge of the colored material in a first recording scan of recording the colored material and a discharge of the high transmissivity material in a second recording scan of recording the high transmissivity material are represented by the binary data for each recording scan, and wherein the high transmissivity material is recorded at a predetermined thickness on a recording layer of the colored material after the first recording scan.

In another aspect, an image processing method of generating image data for image recording using, as recording materials, a colored material and a high transmissivity material higher in transmittance than the colored material, comprising: using a processor to perform steps of: performing color separation processing on input image data so as to generate material amount data representing a recording amount of each recoding material; and performing halftone processing of generating binary data for each recording scan in an image recording apparatus based on the material amount data, wherein a discharge of the colored material in a first recording scan of recording the colored material and a discharge of the high transmissivity material in a second recording scan of recording the high transmissivity material are represented by the binary data for each recording scan, and wherein the high transmissivity material is recorded at a predetermined thickness on a recording layer of the colored material after the first recording scan.

According to these aspects, the color gamut of an image recording apparatus can be expanded by the optical thin film of a high transmissivity material.

Further features of the present invention will become apparent from the following description of exemplary embodiments with reference to the attached drawings.

BRIEF DESCRIPTION OF THE DRAWINGS

FIG. 4 is a flowchart for explaining image processing to be executed by the image processing apparatus.

FIG. 5 is a view for explaining recording scans in 4-pass printing using all recording elements.

FIG. 6 is a view showing recording scans in another 4-pass printing.

FIGS. 8A and 8B are views each showing an example of the recording data setting table.

FIGS. 9A and 9B are views for explaining a method of setting recording data for each recording scan.

FIGS. 12A and 12B are flowcharts for explaining halftone processing.

FIGS. 13A and 13B are views each showing an example of a threshold matrix.

FIG. 15 is a table showing a dot arrangement at the color gamut boundary portion.

FIGS. 17A to 17D are graphs each showing the result of measuring the spectral reflectance of specular reflection light by an optical thin film.

FIG. 18 is a table showing a dot arrangement at the color gamut internal portion.

FIGS. 22A to 22D are graphs each showing the result of measuring the spectral reflectance of specular reflection light by an optical thin film.

DESCRIPTION OF THE EMBODIMENTS

Figure 1:
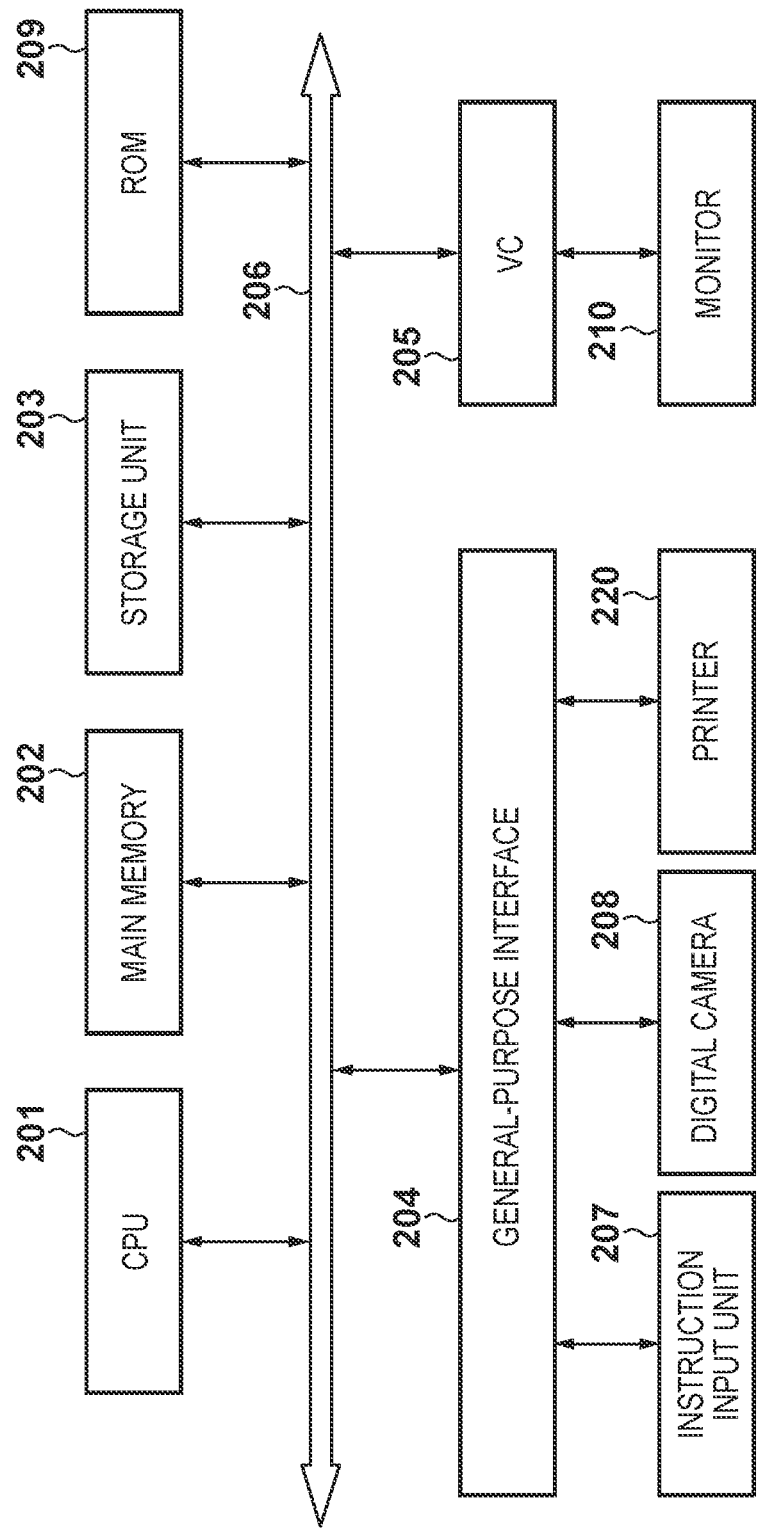
FIG. 1 is a block diagram showing the arrangement of an information processing apparatus which executes image processing according to an embodiment.

An image processing apparatus and image processing method according to an embodiment of the present invention will now be described in detail with reference to the accompanying drawings. Note that arrangements set forth in the following embodiments are merely examples, and the present invention is not limited to the illustrated arrangements.

In the following description, relatively low-transmittance color materials having the colors of cyan C, magenta M, yellow Y, and black K (so-called process colors) will be called "colored materials", and a pigment ink containing a colored material will be called a "colored ink". The respective colored materials will be called "C color material", "M color material", "Y color material", and "K color material". The respective colored inks will be called "C ink", "M ink", "Y ink", and "K ink". Color material amount data of the respective colors after color separation will be called "C data", "M data", "Y data", and "K data".

A high transmissivity material higher in transmittance than a colored material will be called a "colorless material". A pigment ink containing a colorless material will be called a "colorless ink". Note that the colorless material suffices to be a color material higher in transmittance than a colored material. Even if a color material is slightly turbid or colored, it can be used as a colorless material. In some cases, the color of a colorless ink will be called "clear T", the colorless ink will be called "T ink", and color material amount data of the colorless material will be called "T data".

[Outline]

An example will be explained, in which the color saturation is improved, in other words, the color gamut is expanded at the boundary portion of a color gamut reproducible by an image recording apparatus by controlling the color, intensity, or color and intensity of a structural color by thin film interference using a colored ink and colorless ink.

More specifically, when fixing a colorless material on the recording layer of a colored material, an optical thin film is formed from the recording layer (to be referred to as a "clear layer" hereinafter) of the colorless material at the color gamut boundary portion. The formation of the clear layer is controlled so that the hue of the structural color by thin film interference becomes equal to or approximate to the hue of the colored material on the lower layer. Accordingly, the high transmissivity material can comprise a color material having a hue equal to or approximate to that of the colored material, and transmittance higher than that of the colored material.

At the internal portion of the color gamut, the formation of the clear layer is controlled so that the variation of the thickness of the clear layer is increased to suppress thin film interference. At an intermediate portion between the color gamut boundary portion and the color gamut internal portion, the variation of the thickness of the clear layer is controlled to fall between thicknesses at the color gamut boundary portion and color gamut internal portion so that the borderline between the color gamut boundary portion and the color gamut internal portion does not stand out.

[Apparatus Arrangement]

The arrangement of an information processing apparatus which executes image processing according to the embodiment is shown in the block diagram of FIG. 1.

A microprocessor (CPU) 201 uses, as a work memory, a main memory 202 such as a random access memory (RAM), and executes a program stored in a read-only memory (ROM) 209 or a storage unit 203 such as a hard disk drive (HDD) or solid state drive (SSD), thereby controlling an arrangement (to be described later) through a system bus 206. Note that the ROM 209 and storage unit 203 store programs for implementing image processing (to be described later), and various data.

An instruction input unit 207 such as a keyboard or mouse, a digital camera 208 (or scanner), a printer 220, and the like are connected to a general-purpose interface (I/F) 204 such as USB (Universal Serial Bus) or IEEE1394. A monitor 210 is connected to a video card (VC) 205. The CPU 201 displays, on the monitor 210, information representing a user interface (UI), the progression of processing, and the result of processing.

For example, in accordance with a user instruction input through the instruction input unit 207, the CPU 201 loads, into a predetermined area of the main memory 202, an application program (AP) stored in the storage unit 203. The CPU 201 executes the AP to display a UI on the monitor 210 in accordance with the AP.

Then, in accordance with an operation to the UI by the user, the CPU 201 loads various data stored in the storage unit 203 into a predetermined area of the main memory 202. In accordance with the AP, the CPU 201 performs predetermined arithmetic processing on these data loaded in the main memory 202. In accordance with an operation to the UI by the user, the CPU 201 displays the arithmetic processing result on the monitor 210, outputs it to the printer 220, or stores it in the storage unit 203.

Note that the CPU 201 can transmit/receive programs, data, and arithmetic processing results to/from a server apparatus on a network through a network I/F (not shown) connected to the system bus 206.

Figure 2:
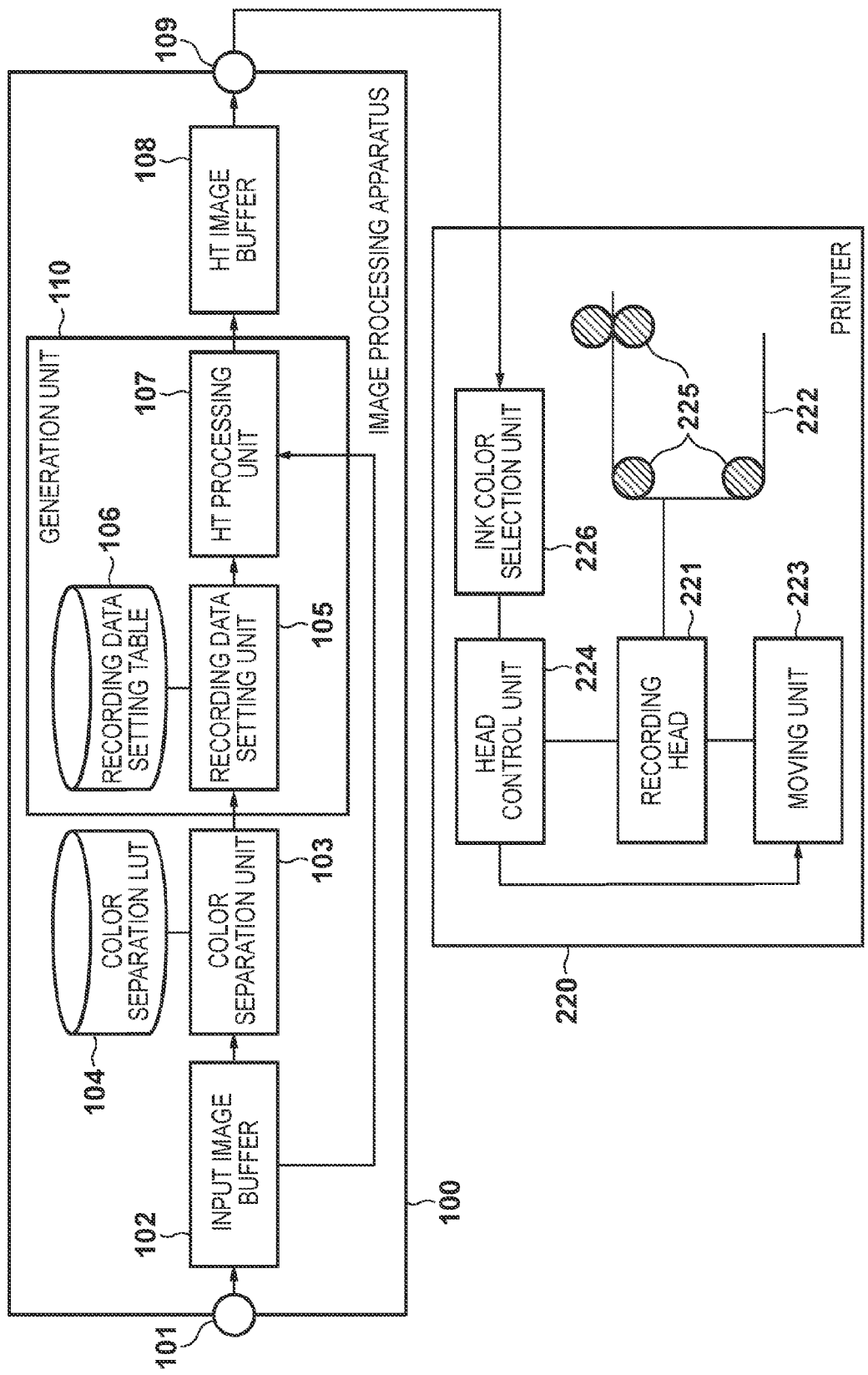
FIG. 2 is a block diagram showing the processing arrangement of the image processing apparatus and the arrangement of a printer according to the embodiment.

The processing arrangement of the image processing apparatus and the arrangement of the printer according to the embodiment are shown in the block diagram of FIG. 2.

An image processing apparatus 100 which generates image data for image recording is implemented by executing the program of a printer driver by the information processing apparatus (computer) shown in FIG. 1. Note that the function of the image processing apparatus 100 can also be given to the printer 220 by mounting, in the printer 220, a one-chip microcontroller in which a program for executing processing of each unit of the image processing apparatus 100 (to be described later) is installed.

Image Processing Apparatus

An input image buffer 102 of the image processing apparatus 100 buffers image data to be printed that is input from, for example, the digital camera 208 through an input unit 101 implemented by the general-purpose I/F 204. A color separation unit 103 looks up a color separation lookup table (LUT) 104, and color-separates, for example, RGB image data stored in the input image buffer 102 into color material amount data corresponding to ink colors prepared in the printer 220. The ink colors in the embodiment are five, cyan C, magenta M, yellow Y, black K, and clear T, as described above.

A generation unit 110 comprises a recording data setting unit 105, recording data setting table 106, and halftone (HT) processing unit 107, and generates image data to be outputted to the printer 220 from the color material amount data.

Based on the recording data setting table 106, the recording data setting unit 105 sets recording data for each recording scan from the color material amount data of each color output from the color separation unit 103. Note that the recording data represents the recording amount (ink amount) of a color material to be recorded by each recording scan.

The HT processing unit 107 outputs, as recording data (to be referred to as "HT data" hereinafter) having undergone halftone processing, quantized data obtained by quantizing the recording data which is output from the recording data setting unit 105 for each recording scan. Recording data of T ink is generated by dither processing corresponding to the values of the R, G, and B channels (that is, the values of image data before color separation) of the input image buffer 102, details of which will be described later.

The HT data for each recording scan output from the generation unit 110 are stored in a halftone (HT) image buffer 108, and output to the printer 220 in accordance with the recording scan through an output unit 109 implemented by the general-purpose I/F 204.

Printer

The printer 220 is a recording apparatus of a thermal transfer method, inkjet method, or the like. The printer 220 moves a recording head 221 lengthwise and sidewise relatively to a recording medium 222 to form, on the recording medium 222, an image represented by HT data input for each band from the image processing apparatus 100. At this time, an ink color selection unit 226 selects, from the ink colors prepared in the recording head 221, an ink color corresponding to the HT data input from the image processing apparatus 100.

The recording head 221 includes one or more recording elements (nozzles in the inkjet method). The relative lengthwise and breadthwise movements of the recording head 221 are implemented by controlling a moving unit 223 by a head control unit 224 to move the recording head 221 in the X direction (main scanning direction), and controlling conveyance units 225 by the head control unit 224 to convey the recording medium 222 in the Y direction (sub-scanning direction).

Figure 3A:
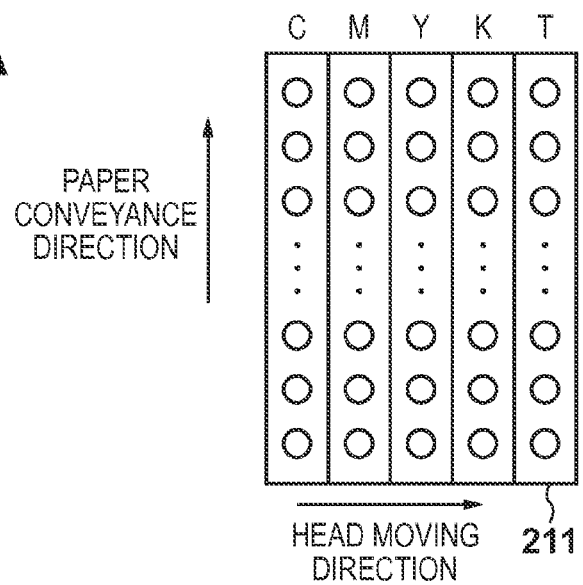
FIGS. 3A and 3B are views showing the arrangement of a recording head.
Figure 3B:
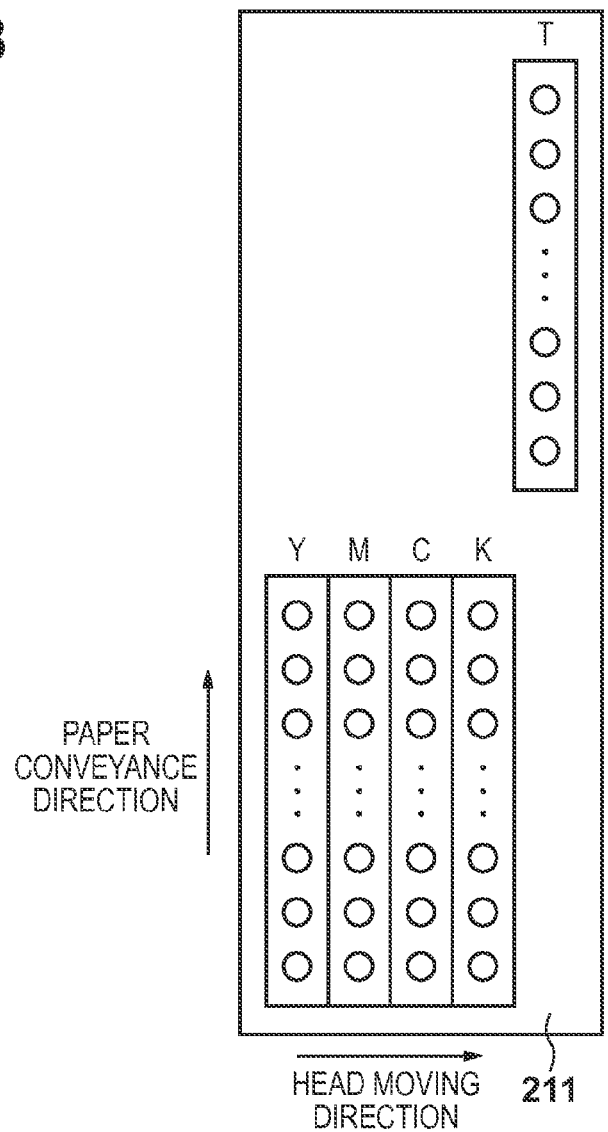

FIGS. 3A and 3B show the arrangement of the recording head 221. Ink colors in the embodiment are five, cyan C, magenta M, yellow Y, black K, and clear T, as described above. The recording head 221 includes recording element strings which discharge inks of these five colors.

For descriptive convenience, FIGS. 3A and 3B show an arrangement in which recording elements are arranged in line in the Y direction (sub-scanning direction) in which the recording medium 222 is conveyed. However, the number and arrangement of recording elements are not limited to this example. For example, recording elements having different ink discharge amounts may be arranged as recording elements of the same color (density), or a plurality of recording element strings having the same discharge amount may be arranged. Further, recording elements may be arranged in a zigzag manner. FIG. 3A shows an example in which the recording element strings of the respective ink colors are arranged at the same sub-scanning position. However, for example, the recording element string of T ink may be arranged at a different sub-scanning position, as shown in FIG. 3B.

[Image Processing]

Image processing to be executed by the image processing apparatus 100 will be explained with reference to the flowchart of FIG. 4. FIG. 4 shows processing for one band. Although not shown in FIG. 4, the processing in FIG. 4 is repeated for each band until all image data to be printed are processed.

An example will be explained, in which the color and intensity of a structural color by thin film interference are controlled using Y ink and T ink to improve the saturation of yellow Y at the color gamut boundary portion.

More specifically, when superposing a colorless material on the Y color material, at the color gamut boundary portion, the formation of the clear layer is controlled so that the clear layer forms an optical thin film, and the hue of the structural color by thin film interference becomes equal to or approximate to the hue of the Y color material on the lower layer. At the color gamut internal portion, the formation of the clear layer is controlled so that the variation of the thickness of the clear layer is increased to suppress thin film interference. Further, at an intermediate portion between the color gamut boundary portion and the color gamut internal portion, the variation of the thickness of the clear layer is controlled to fall between thicknesses at the color gamut boundary portion and color gamut internal portion so that the borderline between the color gamut boundary portion and the color gamut internal portion does not stand out.

By these control operations, the color gamut is expanded in the saturation direction by using thin film interference by the optical thin film of the colorless material. At the color gamut internal portion and color gamut boundary portion, the intensity of thin film interference is adjusted to make less conspicuous the borderline between the color gamut boundary portion and the color gamut internal portion.

The input image buffer 102 stores RGB image data input through the input unit 101 (S101). By looking up the color separation LUT 104, the color separation unit 103 performs color separation processing on the RGB image data stored in the input image buffer 102 to generate color material amount data C, M, Y, K, and T of the respective ink colors (S102):

$$C = C_{LUT\_3D}(R,G,B);$$

$$M = M_{LUT\_3D}(R,G,B);$$

$$Y = Y_{LUT\_3D}(R,G,B);$$

$$K = K_{LUT\_3D}(R,G,B);$$

$$T = T_{LUT\_3D}(R,G,B); \qquad (1)$$

where $X_{LUT\_3D}$ is the color separation table for X color in the color separation LUT 104, and X is C, M, Y, K, and T.

In the following description, color material amount data after color separation has the number of tone levels of 8 bits, but the color of image data may be separated into color material amount data having a larger number of tone levels.

Processes in steps S103 to S105 are executed for each color based on determination in step S106. Processes for Y ink and T ink will be explained, and processes for the remaining three color inks will be omitted. However, the remaining three color inks are processed similarly to Y ink. After the end of processing all the colors, HT data of each band is output to the printer 220 (S107).

Setting of Coordinate $y_{CUT}(k)$ of Cutting Position

The recording data setting unit 105 sets a scan number k, and $y_{CUT}(k)$ indicating the coordinate of the cutting position of color material amount data in the sub-scanning direction (S103). The coordinate $y_{CUT}(k)$ indicates the cutting position of color material amount data at the scan number k, and is equivalent to the upper end of the recording element string. The initial value of the scan number k is "1", and the scan number k is incremented for each processing loop.

A method of setting the coordinate $y_{CUT}(k)$ of the cutting position of color material amount data will be explained by exemplifying so-called 4-pass printing in which a recording element string includes 16 recording elements and an image is formed by four recording scans in the same main scanning recording region on an image.

Recording scans in 4-pass printing using all recording elements will be described with reference to FIG. 5. When printing an image by 4-pass printing using all the recording elements of the recording element string, recording is performed using ¼ recording elements of the recording element string at the lower end at the scan number k=1, as shown in FIG. 5. At the scan number k=2, the recording medium 222 is conveyed by ¼ of the length (to be referred to as a "string length" hereinafter) of the recording element string, and recording is performed using ½ recording elements of the recording element string at the lower end.

Similarly, at the scan number k=3, the recording medium 222 is conveyed by ¼ of the string length, and recording is performed using ½ recording elements at the middle of the recording element string. At the scan number k=4, the recording medium 222 is conveyed by ¼ of the string length, and recording is performed using ½ recording elements of the recording element string at the upper end. At the scan number k=5, the recording medium 222 is conveyed by ¼ of the string length, and recording is performed using ¼ recording elements of the recording element string at the upper end. The paper feed and recording as shown in FIG. 5 are repeated, finally forming an output image.

Hence, the coordinate $y_{CUT}(k)$ of the cutting position of color material amount data that is equivalent to the upper end of the recording element string is a value associated with the number of recording elements of the recording element string and the number of passes. The coordinate $y_{CUT}(k)$ of the cutting position of color material amount data in each recording scan is given by:

$$y_{CUT}(k) = -Nz + (Nz/\text{Pass}) \times k \quad (2)$$

where Nz is the number of recording elements of the recording element string, and Pass is the number of passes.

For example, in FIG. 5, for k=1, $y_{CUT}(1) = -16 + (16/4) \times 1 = -16 + 4 = -12$.

FIG. 5 shows an example of 4-pass printing using all recording elements. However, it is also possible to increase the number of recording elements used in one recording scan and perform recording by the same paper feed amount (¼ of the string length) as that in the example of FIG. 5. FIG. 6 shows recording scans in another 4-pass printing. FIG. 6 shows an example in which the same image as that in FIG. 5 is formed by the same paper feed amount using half the recording elements. In FIG. 6, the paper feed amount is the same, but the number of recording elements used in one recording scan is doubled, and an image is formed by substantially 2-pass printing. However, the number of recording elements used in printing becomes ½ of all the recording elements in FIG. 5, and the number of recording dots in each pass is doubled.

In the embodiment, as shown in FIG. 6, a colored ink is recorded using ½ recording elements of the recording element string at the lower end, and T ink is recorded using ½ recording elements at the upper end to fix the colorless material on the recording layer of the colored material.

Recording Data Setting Table

Figure 7A:
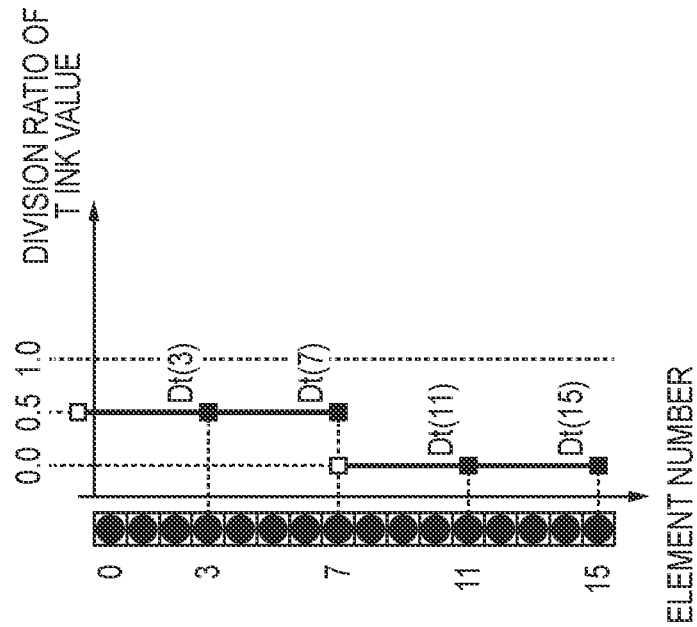
FIGS. 7A and 7B are views for explaining a table stored in a recording data setting table.
Figure 7B:
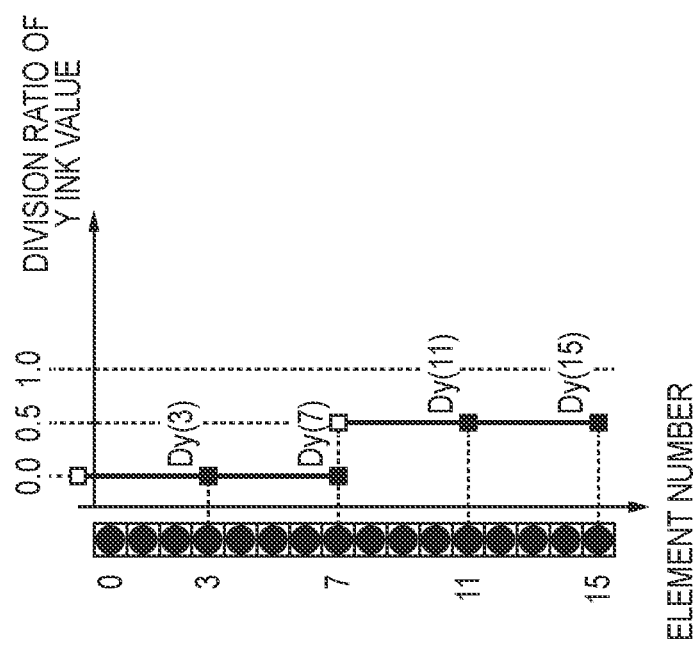

A table stored in the recording data setting table 106 will be explained with reference to FIGS. 7A and 7B. FIGS. 7A and 7B show recording data setting tables each representing the division ratio of an ink value when the paper feed amount is ¼ of the string length. In FIGS. 7A and 7B, the ordinate represents an element number corresponding to the position of a recording element, and the abscissa represents the division ratio of an ink value. FIG. 7A shows the division ratio of the ink value of Y ink. "0.5" is set for ½ recording elements of the recording element string at the lower end, and "0" is set for ½ recording elements at the upper end. FIG. 7B shows the division ratio of the ink value of T ink. "0" is set for ½ recording elements of the recording element string at the lower end, and "0.5" is set for ½ recording elements at the upper end.

The division ratio of the ink value is set for, for example, every four recording elements. In the example of FIG. 7A, division ratios Dy(3), Dy(7), Dy(11), and Dy(15) of the ink value for recording elements having element numbers 3, 7, 11, and 15 are set. More specifically, the division ratio of the ink value for element numbers 0 to 3 is Dy(3). Similarly, the division ratio of the ink value for element numbers 4 to 7 is Dy(7), the division ratio of the ink value for element numbers 8 to 11 is Dy(11), and the division ratio of the ink value for element numbers 12 to 15 is Dy(15).

Similarly, in the example of FIG. 7B, division ratios Dt(3), Dt(7), Dt(11), and Dt(15) of the ink value for recording elements having element numbers 3, 7, 11, and 15 are set. More specifically, the division ratio of the ink value for element numbers 0 to 3 is Dt(3). Similarly, the division ratio of the ink value for element numbers 4 to 7 is Dt(7), the division ratio of the ink value for element numbers 8 to 11 is Dt(11), and the division ratio of the ink value for element numbers 12 to 15 is Dt(15). The respective division ratios of the ink value are set according to the following rule:

$$Dy(3)+Dy(7)+Dy(11)+Dy(15)=1.0;$$

$$Dt(3)+Dt(7)+Dt(11)+Dt(15)=1.0; \quad (3)$$

That is, as shown in FIG. 7A, the division ratios of the ink value of Y ink are Dy(3)=Dy(7)=0.0, and Dy(11)=Dy(15)=0.5. This means that recording of Y ink is performed using ½ recording elements at the lower end. That is, an ink amount based on color material amount data is recorded based on the division ratio "0.5" of the ink value and 2-pass printing of printing the same region twice.

As shown in FIG. 7B, the division ratios of the ink value of T ink are Dt(3)=Dt(7)=0.5, and Dt(11)=Dt(15)=0.0. This means that recording of T ink is performed using ½ recording elements at the upper end. The division ratios Dc, Dm, and Dk of the ink values of the remaining three colors C, M, and K are equal to the division ratio Dy of the ink value. This means that ½ recording elements at the lower end are used.

From the division ratio Dy of the ink value of Y ink and the division ratio Dt of the ink value of T ink, a function regarding a recording element position ny is given by:

$$
\begin{aligned}
&\text{if } (0 \le ny < Nz/2) \{ \\
&\quad Dy(ny) = 0.0; \\
&\quad Dt(ny) = 0.5; \\
&\} \\
&\text{if } (Nz/2 \le ny < Nz) \{ \\
&\quad Dy(ny) = 0.5; \\
&\quad Dt(ny) = 0.0; \\
&\} \quad \ldots(4)
\end{aligned}
$$

After the division ratios of the ink values represented by expression (4) are determined, a recording data setting table for Y ink (to be referred to as a "Y table" hereinafter) and a recording data setting table for T ink (to be referred to as a "T table" hereinafter) can be decided. FIGS. 8A and 8B show an example of the recording data setting tables. In FIGS. 8A and 8B, the ordinate represents the element number, and the abscissa represents the value of the recording data setting table. FIG. 8A shows the Y table. Two tables, that is, a low-order table (first table) indicated by a broken line, and a high-order table (second table) indicated by a solid line are set. FIG. 8B shows the T table. Two tables, that is, a low-order table (first table) indicated by a broken line, and a high-order table (second table) indicated by a solid line are set.

The reason that the recording data setting tables as shown in FIGS. 8A and 8B are set will be described in detail in the following description of halftone processing and the dot arrangement. The low-order table $Y_L(ny)$ and high-order table $Y_H(ny)$ of the Y table are generated according to the following rule:

$$
\begin{aligned}
&\text{if } (0 \le ny < Nz) \{ \\
&\quad Y_L(ny) = Dy(ny + Nz/4) + Dy(ny + 2 \times Nz/4) + Dy(ny + 3 \times Nz/4); \\
&\quad Y_H(ny) = Dy(ny) + Dy(ny + Nz/4) + Dy(ny + 2 \times Nz/4) + Dy(ny + 3 \times Nz/4); \\
&\} \quad \ldots(5)
\end{aligned}
$$

That is, the values of the low- and high-order tables of the Y table are as follows:

$$
\begin{aligned}
&\text{if } (0 \le ny < 4) \{ \\
&\quad Y_L(ny) = 1.0; \\
&\quad Y_H(ny) = 1.0; \\
&\} \\
&\text{if } (4 \le ny < 8) \{ \\
&\quad Y_L(ny) = 1.0; \\
&\quad Y_H(ny) = 1.0; \\
&\} \\
&\text{if } (8 \le ny < 12) \{ \\
&\quad Y_L(ny) = 0.5; \\
&\quad Y_H(ny) = 1.0; \\
&\} \\
&\text{if } (12 \le ny < 16) \{ \\
&\quad Y_L(ny) = 0.0; \\
&\quad Y_H(ny) = 0.5; \\
&\}
\end{aligned}
$$

Similarly, the values of the low- and high-order tables of the T table are as follows:

$$
\begin{aligned}
&\text{if } (0 \le ny < 4) \{ \\
&\quad T_L(ny) = 0.5; \\
&\quad T_H(ny) = 1.0; \\
&\} \\
&\text{if } (4 \le ny < 8) \{ \\
&\quad T_L(ny) = 0.0; \\
&\quad T_H(ny) = 0.5; \\
&\} \\
&\text{if } (8 \le ny < 16) \{ \\
&\quad TL(ny) = 0.0; \\
&\quad TH(ny) = 0.0; \\
&\}
\end{aligned}
$$

Setting of Recording Data (S104)

Referring back to the description of the processing shown in FIG. 4, if the coordinate $y_{CUT}(k)$ is set, the recording data setting unit 105 sets recording data for each recording scan from color material amount data of each color based on the recording data setting table 106 (S104).

A method of setting recording data for each recording scan will be explained with reference to FIGS. 9A and 9B. Here, setting of recording data will be explained by exemplifying printing of a patch image of yellow Y at the color gamut boundary portion when the R, G, and B values of input image data indicate the color gamut boundary portion, for example, the R, G, and B values=(255, 255, 0).

In this case, as shown in FIG. 9A, Y data is "255 (100%)" based on equations (1), and Y data 1301 is "255" for all pixels. To the contrary, as shown in FIG. 9B, T data of the colorless material recorded on the Y color material is a predetermined value α (for example, "128 (50%)") based on equations (1), and T data 1305 is "α" for all pixels.

The predetermined value α is a value set to maximize the color gamut based on preliminary measurement, details of which will be described later. For example, when the colorless material is formed at T=α on the Y color material, the thin film of the colorless material is formed at a thickness of about 40 nm, and the structural color by thin film interference becomes yellow. As a result, the Y color material on the lower layer and the yellow structural color exhibit a synergistic effect, improving the saturation in the yellow direction in the color gamut.

As shown in FIG. 9A, the Y data 1301 is converted into low-order recording data (first recording data) $Y_L$ 1303 by multiplication by the low-order table $Y_L(ny)$ shown in FIG. 8A. The Y data 1301 is converted into high-order recording data (second recording data) $Y_H$ 1304 by multiplication by the high-order table $Y_H(ny)$. Also, as shown in FIG. 9B, the T data 1305 is converted into low-order recording data $T_L$ 1307 by multiplication by the low-order table $T_L(ny)$ shown in FIG. 8B. The T data 1305 is converted into high-order recording data $T_H$ 1308 by multiplication by the high-order table $T_H(ny)$.

Details of the multiplication of the Y data 1301 and Y table, and the multiplication of the T data 1305 and T table are as follows:

$$Y_L(x,ny)=Y(x,ny+y_{CUT}(k)) \times Y_L(ny);$$

$$Y_H(x,ny)=Y(x,ny+y_{CUT}(k)) \times Y_H(ny);$$

$$T_L(x,ny)=T(x,ny+y_{CUT}(k)) \times T_L(ny);$$

$$T_H(x,ny)=T(x,ny+y_{CUT}(k)) \times T_H(ny); \quad (6)$$

where $Y(x, ny+y_{CUT}(k))$ is Y data of the coordinate (x, $ny+y_{CUT}(k)$) obtained by equations (1), and
$T(x, ny+Y_{CUT}(k))$ is T data of the coordinate (x, $ny+y_{CUT}(k)$) obtained by equations (1).

When the coordinate (x, ny+$y_{CUT}$(k)) exists outside the region of an image, recording data is set to 0. For example, at the scan number k=1, the Y-coordinate of recording data corresponding to the element number ny=0 to 10 for ¾ of the recording element string at the upper end becomes negative, and 0 is substituted into both high-order recording data and low-order recording data. On the other hand, 0 is not substituted into recording data corresponding to the element number ny=11 to 15 for ¼ of the recording element string at the lower end, and the calculation results of equations (6) are maintained.

Figure 10A:
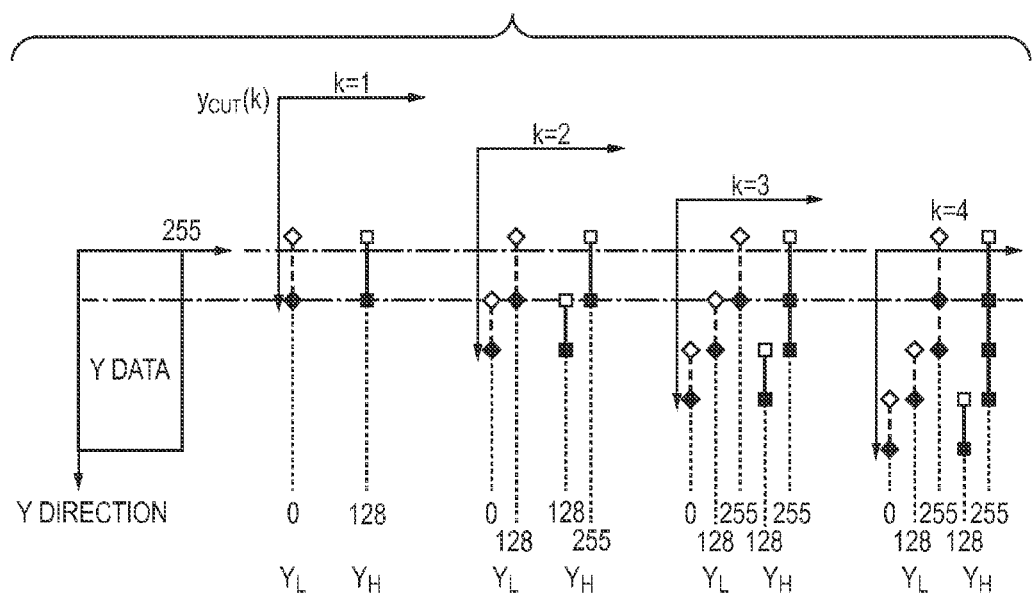
FIGS. 10A and 10B are views showing cutting positions at the scan number k=1 to k=4.
Figure 10B:
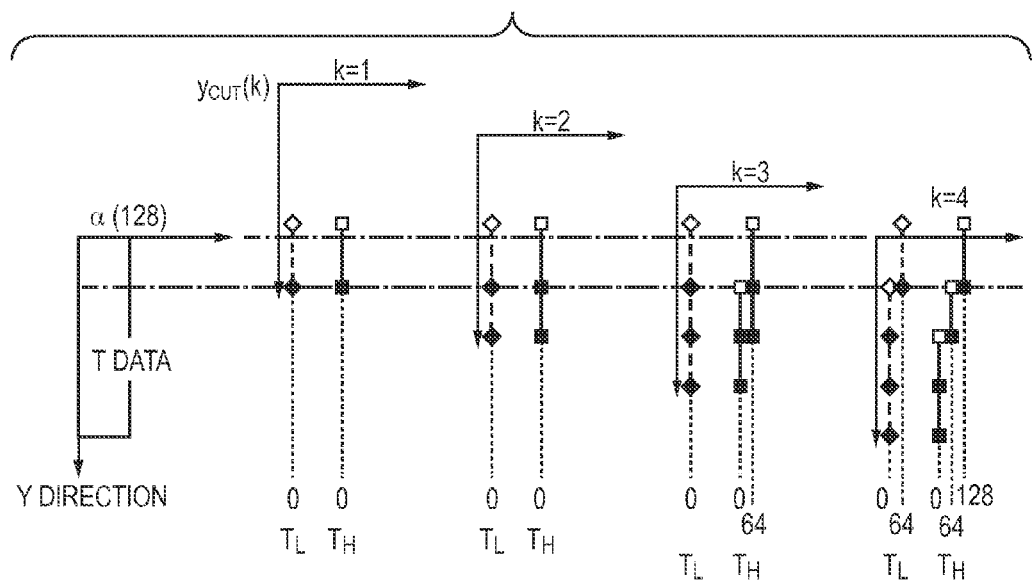

FIGS. 10A and 10B show cutting positions at the scan number k=1 to k=4. The cutting position $y_{CUT}$(k) of color material amount data is determined by the scan number k. FIG. 10A shows low-order recording data $Y_L$ and high-order recording data $Y_H$ which are determined by equations (6) and correspond to the positions of recording elements used at each scan number. FIG. 10B shows low-order recording data $T_L$ and high-order recording data $T_H$ which are determined by equations (6) and correspond to the positions of recording elements used at each scan number.

Halftone Processing (S105)

After the end of setting recording data by the recording data setting unit 105 (S104), the HT processing unit 107 generates HT data by quantizing the recording data by halftone processing (S105). Recording data of T ink undergoes halftone processing in accordance with the values of the R, G, and B channels of the input image buffer 102, details of which will be described later.

Halftone processing according to the embodiment differs between a colored ink and T ink. Especially, the thickness of the clear layer and the variation of the thickness are controlled in accordance with a color represented by input image data. More specifically, at the color gamut boundary portion, the thickness of the clear layer is controlled so that the variation of the thickness of the clear layer is reduced by enhancing the dispersion of dots of a halftone image, and the hue of the structural color by thin film interference of the colorless material becomes equal to or approximate to the hue of a color material on the lower layer. Thus, at the color gamut boundary portion, a structural color of a hue equal to or approximate to the hue of the color material on the lower layer is obtained to expand the color gamut in the saturation direction.

Conversely, at the color gamut internal portion, the variation of the thickness of the clear layer is increased by enhancing the concentration of dots of the halftone image in the recording scan. This decreases the intensity of thin film interference of the clear layer, and suppresses the stain of specular reflection light that exerts an adverse effect when observing an image. In other words, the degree of variation of the thickness of the clear layer is controlled by the degree of dot concentration in HT data, thereby controlling the intensity of thin film interference.

Figure 11:
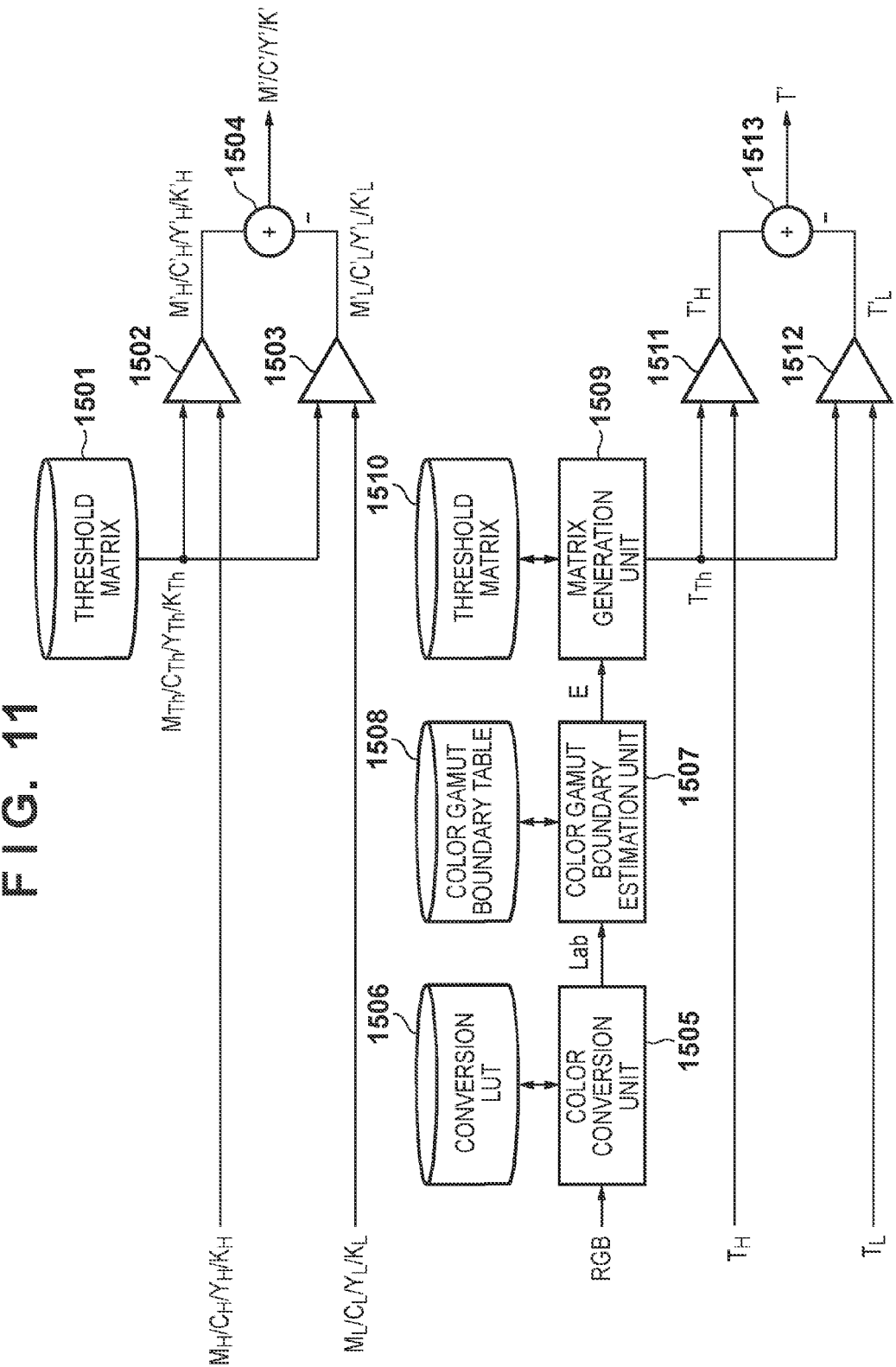
FIG. 11 is a block diagram showing the arrangement of an HT processing unit.

The arrangement of the HT processing unit 107 is shown in the block diagram of FIG. 11. Halftone processing (S105) will be explained with reference to the flowcharts of FIGS. 12A and 12B. To simplify the description, an example in which binarization is performed as quantization will be explained.

<Halftone Processing for Colored Ink>

First, halftone processing (S105) for a colored ink will be explained with reference to FIGS. 11 and 12A.

Figures 13A, 13B:
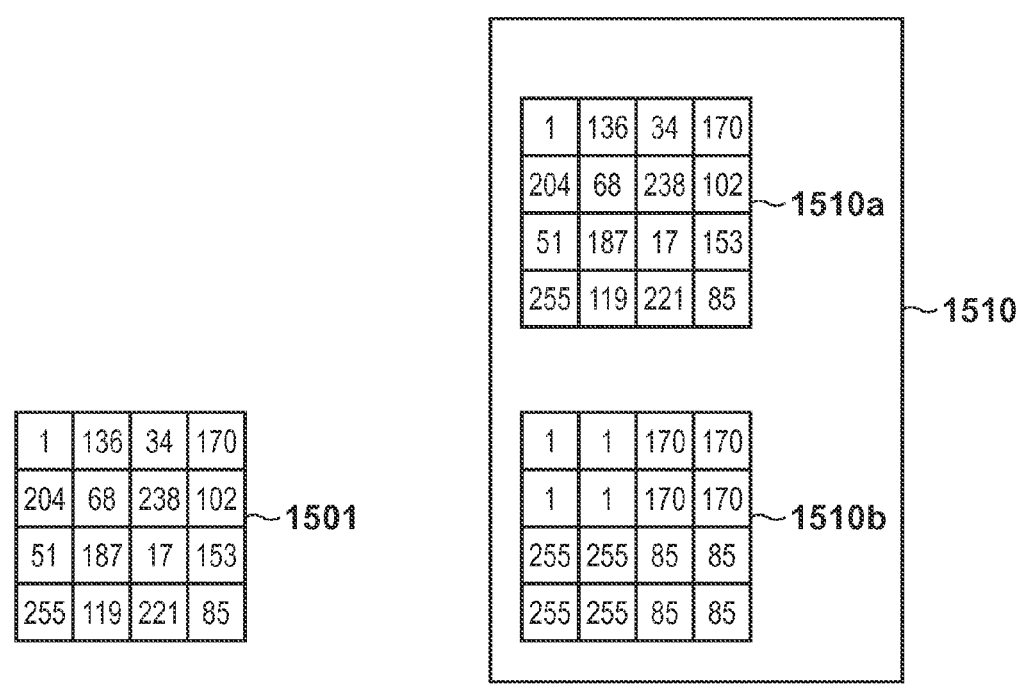

A comparator 1502 compares a threshold $Y_{Th}$ in a threshold matrix 1501 with the high-order recording data $Y_H$ of Y ink to quantize the high-order recording data $Y_H$ (S201). FIGS. 13A and 13B show an example of the threshold matrix. Each threshold in the threshold matrix 1501 shown in FIG. 13A corresponds to a pixel in image data. More specifically, the comparator 1502 compares the threshold $Y_{Th}$ with the high-order recording data $Y_H$ for each pixel. As a result of the comparison, a binarization result $Y'_H$ is obtained:

$$\text{if } (Y_H < Y_{Th})$$
$$Y'_H = 0;$$
$$\text{else}$$
$$Y'_H = 255; \quad\quad ...(7)$$

A comparator 1503 compares the threshold YTh in the threshold matrix 1501 with the low-order recording data YL of Y ink to quantize the low-order recording data YL (S202). As a result of the comparison, a binarization result Y'L is obtained:

$$\text{if } (Y_L < Y_{Th})$$
$$Y'_L = 0;$$
$$\text{else}$$
$$Y'_L = 255; \quad\quad ...(8)$$

FIG. 13B shows an example of the threshold matrix 1501 having one threshold for each pixel. However, a plurality of thresholds may be given to each pixel. If the number of thresholds of each pixel is N−1 (N≥2), recording data is converted into N-valued data. The threshold matrix 1501 preferably has a blue noise characteristic in which the dot arrangement can be easily dispersed. The threshold matrix 1501 shown in FIG. 13A is also used to quantize recording data of a colored ink other than Y ink. However, a different threshold matrix may be used for each color or each scan number.

A subtractor 1504 subtracts the binarization result $Y'_L$ from the binarization result $Y'_H$, sets the result as HT data Y' of Y ink (S203), and stores the HT data Y' in the HT image buffer 108 (S204):

$$Y' = Y'_H - Y'_L; \quad\quad (9)$$

Next, it is determined whether the processes in steps S201 to S204 have been performed for band data (from addresses (0, 0) to (W−1, Nz−1)) of one recording scan (S205). If these processes have not been performed yet for the band data, the process returns to step S201. That is, by repeating the processes in steps S201 to S204 for band data of one recording scan, HT data Y' of Y ink for one recording scan is decided to determine the dot arrangement of the Y color material.

As described above, in the embodiment, a colored ink is recorded using ½ recording elements of the recording element string at the lower end, as shown in FIG. 6. Accordingly, HT data for forming dots of the colored material is output in processing at the scan number k=1, 2, and HT data for forming dots of the colored material is not output in processing at the scan number k=3, 4.

<Halftone Processing for Colorless Ink>

Next, halftone processing (S105) for T ink will be explained with reference to FIGS. 11 and 12B.

By looking up a conversion LUT 1506, a color conversion unit 1505 converts RGB data of a pixel of interest acquired from the input image buffer 102, into color values in an appropriate color space (for example, CIELAB space) in order to represent the color reproduction range (color gamut) of the printer 220. That is, the color values of the pixel of interest are acquired (S301):

$$L = L_{LUT\_3D}(R,G,B);$$

$$a = a_{LUT\_3D}(R,G,B);$$

$$b = b_{LUT\_3D}(R,G,B); \quad\quad (10)$$

where $X_{LUT\_3D}$ is the color conversion table for the X component in the conversion LUT 1506, and X is L, a, and b.

Based on the color values L, a, and b output from the color conversion unit 1505, and a color gamut boundary table 1508, a color gamut boundary estimation unit 1507 calculates an estimation value E representing a region of the color gamut of the printer 220 in which the color of the pixel of interest is positioned (S302). If the b value of the L, a, and b values is negative, the color of the pixel of interest is close to blue; if it is positive, the color of the pixel of interest is close to yellow. From this, the color gamut boundary table 1508 is constituted as, for example, a one-dimensional table for outputting the estimation value E calculated by:

if (b < $b_B$);
   E = 0.0;
else
   E = (b − $b_B$)/(100 − $b_B$); ...(11)

That is, if the estimation value E is significant (E>0.0), the color of the pixel of interest is contained in the color gamut boundary portion. As the estimation value E comes close to 1.0, the color of the pixel of interest is close to the color gamut boundary. If the estimation value E=0.0, the color of the pixel of interest is positioned at the color gamut internal portion.

In expression (11), a boundary value $b_B$ corresponding to the borderline between the color gamut boundary portion and the color gamut internal portion is an experimentally obtained value, and for example, $b_B$=80. For example, assuming that the R, G, and B values of yellow Y=(255, 255, 0) at the color gamut boundary portion are converted into L, a, b=(90, 0, 100), b=100 and the estimation value E=1.0. An example in the one-dimensional table based on the b value is stored in the color gamut boundary table 1508 has been explained. However, a three-dimensional Lab table can be stored in the color gamut boundary table 1508 to calculate an estimation value E corresponding to the L, a, and b values. In this case, the degree of dot concentration corresponding to a lightness value L, saturation S, and hue H can be controlled.

A matrix generation unit 1509 generates, in accordance with the estimation value E from a plurality of threshold matrices stored in a threshold matrix 1510, a threshold matrix for controlling the degree of dot concentration (S303). In an example shown in FIG. 13B, the threshold matrix 1510 stores, for example, two threshold matrices, and these threshold matrices have different degrees of dot concentration. A threshold matrix 1510a is a dot dispersion type, and a threshold matrix 1510b is a dot concentration type indicating the concentration of 2×2 dots. Note that thresholds in the threshold matrices 1510a and 1510b are arranged so that the phases of dot arrays match each other as much as possible.

The matrix generation unit 1509 linearly couples the threshold matrices 1510a and 1510b in accordance with the estimation value E, generating a threshold matrix $T_{Th}$ for controlling the degree of dot concentration:

$$T_{Th}(i,j) = E \times th1(i,j) + (1-E) \times th2(i,j); \quad (12)$$

where (i, j) is the cell position of the threshold matrix,
th1(i, j) is the threshold of the threshold matrix 1510a, and
th2(i, j) is the threshold of the threshold matrix 1510b.

That is, a dot dispersion threshold matrix $T_{Th}$ is generated for a large estimation value E, and a dot concentration threshold matrix $T_{Th}$ is generated for a small estimation value E.

A comparator 1511 compares the threshold $T_{Th}$ in the threshold matrix generated by the matrix generation unit 1509 with the high-order recording data $T_H$ of T ink to quantize the high-order recording data $T_H$ (S304). More specifically, the comparator 1511 compares the threshold $T_{Th}$ with the high-order recording data $T_H$ for each pixel. As a result of the comparison, a binarization result $T'_H$ is obtained:

if ($T_H < T_{Th}$)
   $T'_H = 0$;
else
   $T'_H = 255$; ...(13)

A comparator 1512 compares the threshold $T_{Th}$ with the low-order recording data $T_L$ of T ink to quantize the low-order recording data $T_L$ (S305). As a result of the comparison, a binarization result $T'_L$ is obtained:

if ($T_L < T_{Th}$)
   $T'_L = 0$;
else
   $T'_L = 255$; ...(14)

A subtractor 1513 subtracts the binarization result $T'_L$ from the binarization result $T'_H$, sets the result as HT data T' of T ink (S306), and stores the HT data T' in the HT image buffer 108 (S307):

$$T' = T'_H - T'_L \quad (15)$$

After that, it is determined whether the processes in steps S301 to S307 have been performed for band data (from addresses (0, 0) to (W−1, Nz−1)) of one recording scan (S308). If these processes have not been performed yet for the band data, the process returns to step S301. That is, by repeating the processes in steps S301 to S307 for band data of one recording scan, HT data T' of T ink for one recording scan is decided to determine the dot arrangement of the colorless material.

As described above, in the embodiment, as shown in FIG. 6, a colored ink is recorded using ½ recording elements of the recording element string at the lower end, and T ink is recorded using ½ recording elements at the upper end, thereby fixing the colorless material on the recording layer of the colored material. Hence, HT data for forming dots of the colorless material is not output in processing at the scan number k=1, 2, and HT data for forming dots of the colorless material is output in processing at the scan number k=3, 4.

Note that an example has been explained, in which HT data is generated by calculating a difference between HT data of high-order recording data and HT data of low-order recording data. However, this calculation is dispensable. For example, a threshold for determining whether to form a dot may be set between high-order recording data and low-order recording data, and HT data may be formed based on threshold determination.

To simplify the description, an example in which binarization is performed as quantization has been explained. However, when generating multi-valued HT data, a plurality of thresholds may be set in each cell in the threshold matrices 1501 and 1510, and the comparators 1502, 1503, 1511, and 1512 may be replaced with quantizers.

[Dot Arrangement]

Figure 14:
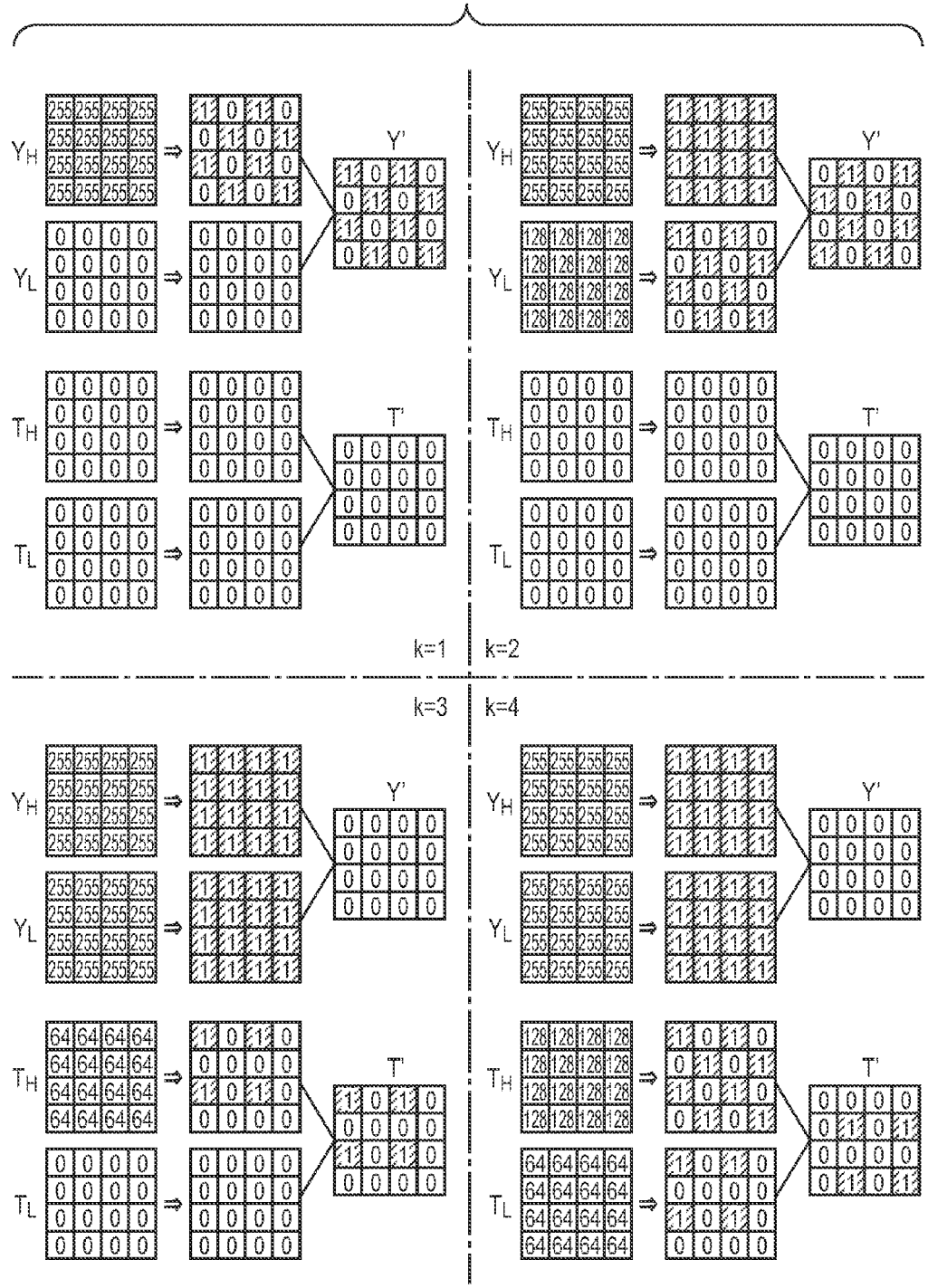
FIG. 14 is a view for explaining HT data generated by the HT processing unit.

HT data generated by the HT processing unit 107 will be described with reference to FIG. 14. In FIG. 14, a value "255" after quantization is represented by "1", and a value "0" is represented by "0".

HT data output at the scan number k=1 is shown at the upper left portion of FIG. 14. As shown in FIG. 10A, Y data at the scan number k=1 are $Y_H$=128 and $Y_L$=0. After quantization, $Y'_H$ becomes "1" or "0", and $Y'_L$ becomes "0" for all pixels. Therefore, "1" or "0" is output as the HT data Y'.

In contrast, as shown in FIG. 10B, T data at the scan number k=1 are "0" for both $T_H$ and $T_L$, and both $T'_H$ and $T'_L$ become "0" for all pixels after quantization. Therefore, "0" is output as the HT data T' for all pixels.

HT data output at the scan number k=2 is shown at the upper right portion of FIG. 14. As shown in FIG. 10A, Y data at the scan number k=2 are $Y_H$=255 and $Y_L$=128. After quantization, $Y'_H$ becomes "1" for all pixels, and $Y'_L$ becomes "1" or "0". Thus, "0" or "1" is output as the HT data Y'. However, the arrangement of "0" pixels and "1" pixels is different from that for k=1.

To the contrary, as shown in FIG. 10B, T data at the scan number k=2 are "0" for both $T_H$ and $T_L$, and both $T'_H$ and $T'_L$ become "0" for all pixels after quantization. "0" is output as the HT data T' for all pixels.

HT data output at the scan number k=3 is shown at the lower left portion of FIG. 14. As shown in FIG. 10A, Y data at the scan number k=3 are "255" for both $Y_H$ and $Y_L$. After quantization, both $Y'_H$ and $Y'_L$ become "1" for all pixels. As a result, "0" is output as the HT data Y' for all pixels.

Conversely, as shown in FIG. 10B, T data at the scan number k=3 are $T_H$=0 and $T_L$=α/2. Assuming that α/2=64 and the threshold matrix 1510a is used, $T'_H$ becomes "1" or "0", and $T'_L$ becomes "0" for all pixels after quantization. Therefore, "1" or "0" is output as the HT data T'.

HT data output at the scan number k=4 is shown at the lower right portion of FIG. 14. As shown in FIG. 10A, Y data at the scan number k=4 are "255" for both $Y_H$ and $Y_L$. After quantization, both $Y'_H$ and $Y'_L$ become "1" for all pixels. Thus, "0" is output as the HT data Y' for all pixels.

In contrast, T data at the scan number k=4 are $T_H$=α/2 and $T_L$=α. Assuming that α=128 and the threshold matrix 1510a is used, $T'_H$ becomes "0" or "1", and $T'_L$ becomes "1" or "0" after quantization. Therefore, "0" or "1" is output as the HT data T'. However, the arrangement of "0" pixels and "1" pixels is partially different from that for k=3.

Figure 15:
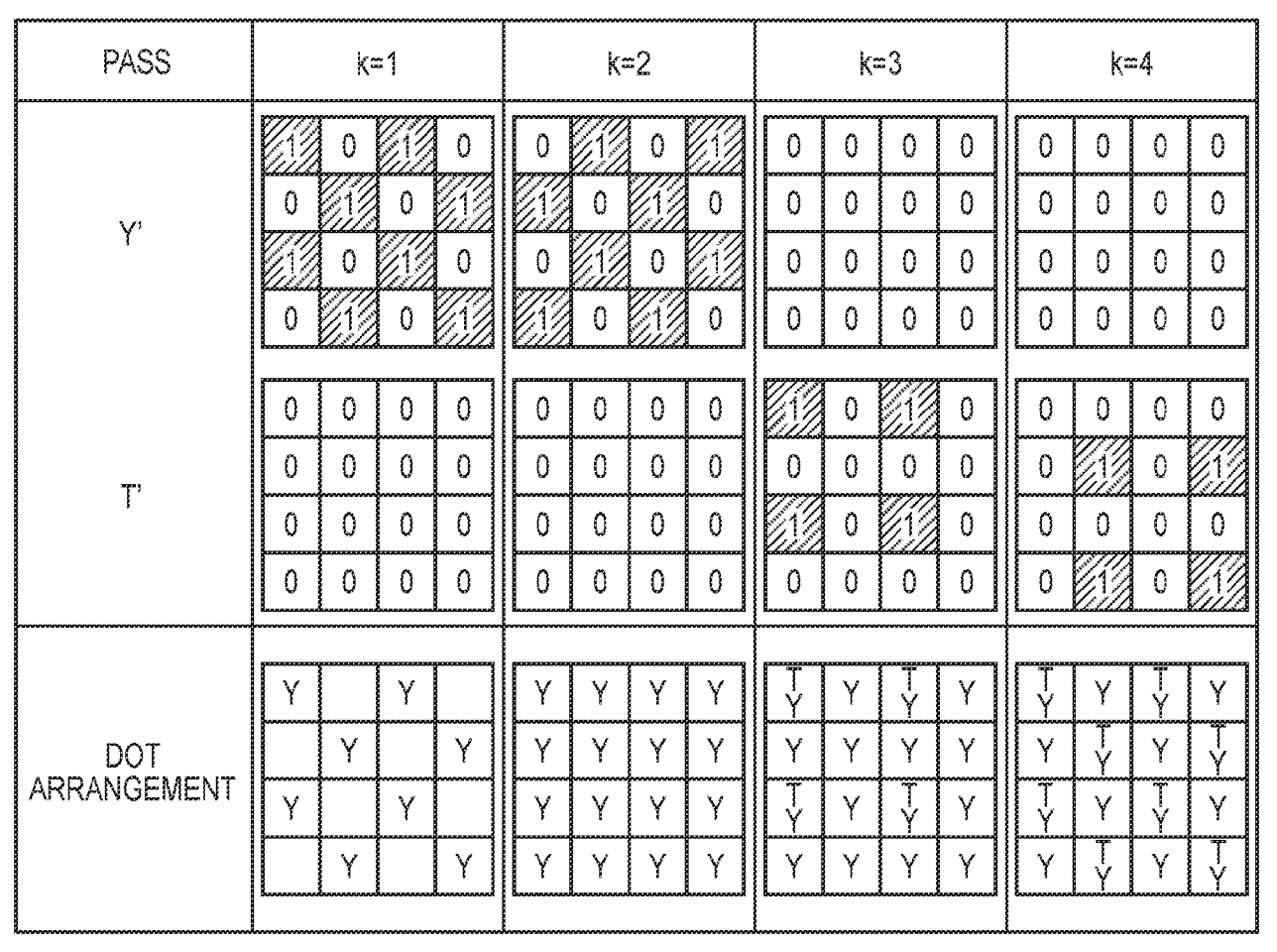

FIG. 15 shows a dot arrangement at the color gamut boundary portion. FIG. 15 shows a dot arrangement when HT data shown in FIG. 14 is output. More specifically, half of Y dots are formed at the scan number k=1, and all of Y dots are formed at k=2. T dots are superposed on some Y dots at k=3, and T dots are superposed on other Y dots at k=4. In the example of FIGS. 14 and 15, the arrangement of T dots of the colorless material is controlled to have high dispersibility.

Note that FIGS. 14 and 15 show an example in which all T dots are superposed on Y dots. However, T dots may be arranged at positions where no Y dot exists, or T dots may be arranged on all Y dots. FIGS. 14 and 15 show an example in which an optical thin film (in this example, a thickness of about 40 nm) is formed based on a dot pattern for dispersing T dots at an area ratio of 50% at the color gamut boundary portion for L, a, b=(90, 0, 100). Therefore, a yellow structural color is generated by thin film interference to expand the color gamut in the yellow direction.

[Structural Color]

The reason that the yellow structural color is generated to expand the color gamut in the yellow direction will be explained with reference to FIGS. 16A and 16B.

Figure 16B:
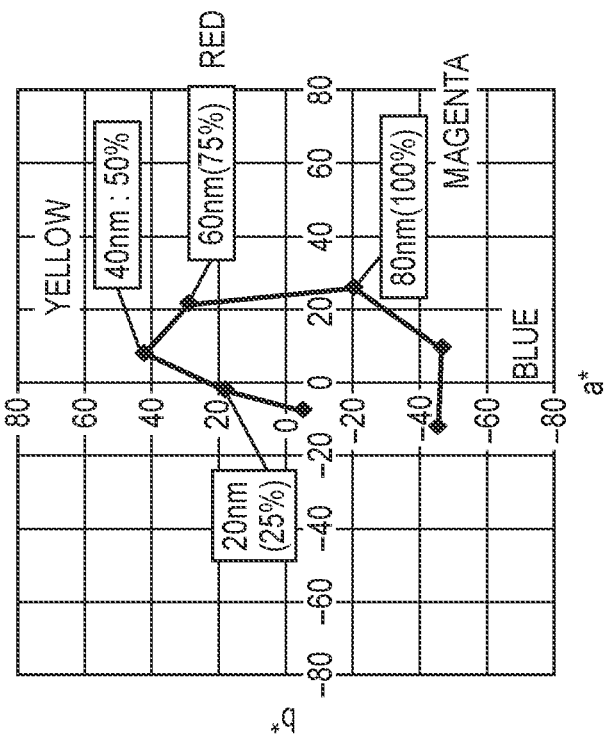
FIGS. 16A and 16B are views for explaining the reason that a yellow structural color is generated to expand the color gamut in the yellow direction.
Figure 16A:
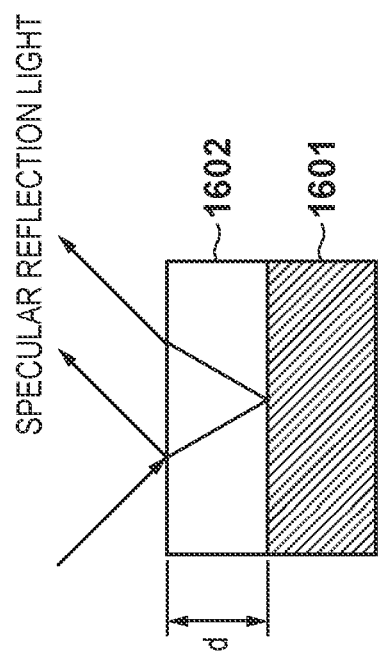

FIGS. 16A and 16B show a state in which the color of specular reflection light changes in accordance with a thickness d of the clear layer by thin film interference of an optical thin film (clear layer) 1602 formed from a colorless material in a lamination state in which the colorless material is superposed on the Y color material on a lower layer 1601. The axes of the graph of FIG. 16B indicate chromaticities a* and b*, and a curve in the graph represents the color of specular reflection light influenced by thin film interference. To discriminate the color of specular reflection light from the color gamut, "*" is added to the color of specular reflection light.

The region in which the color of specular reflection light becomes yellow by thin film interference, that is, the region in which the structural color becomes yellow exists at b*>0 and near a*=0. This becomes most noticeable around a clear layer thickness of 40 nm. In other words, to make the color of specular reflection light yellow by thin film interference, it is only necessary to set the thickness of the clear layer (thickness of the colorless material) to be around 40 nm. In this fashion, the color of specular reflection light is controlled to be yellow by thin film interference. By the synergistic effect of the Y color material on the lower layer with the color of specular reflection light, the color gamut can be expanded in the yellow direction.

FIGS. 17A to 17D each show the result of measuring the spectral reflectance of specular reflection light by the lamination shown in FIG. 16A. The thickness d of the colorless material is 20 nm in FIG. 17A, 40 nm in FIG. 17B, 60 nm in FIG. 17C, and 80 nm in FIG. 17D. Originally, the spectral reflectance of the optical thin film is constant regardless of the thickness d. However, a measurement result in which the spectral reflectance of specular reflection light changes as the thickness d changes is obtained. This measurement result indicates that the apparent spectral reflectance changes by thin film interference.

At the color gamut internal portion, thin film interference does not contribute to expanding of the color gamut and is unnecessary. Instead, it is desirable to suppress thin film interference and achromatize the structural color. Further, the structural colors of various colors at the color gamut internal portion may have an adverse effect on the image quality. At the color gamut internal portion, therefore, the stain of specular reflection light by thin film interference needs to be minimized.

Suppression of Thin Film Interference at Color Gamut Internal Portion

Suppression of thin film interference light in the case of R, G, and B=(255, 255, 128) will be explained below. Assume that the color conversion unit 1505 converts R, G, B=(255, 255, 128) into L, a, b=(90, 0, 50) in the color gamut (S301).

Based on the color values L, a, and b output from the color conversion unit 1505, and the color gamut boundary table 1508, the color gamut boundary estimation unit 1507 estimates the degree at which the color of a pixel of interest is contained in the color gamut boundary portion (S302). In this case, since the b value is smaller than the boundary value $b_B$ (for example, b<80), the estimation value E=0.0.

In the description of "Halftone Processing for Colorless Ink", an example has been explained, in which the estimation value is calculated by $E=(b-b_B)/(100-b_B)$ based on the boundary value $b_B$ for estimating the chromaticity b of the color of a pixel of interest. The estimation value E suffices to come closer to E=0.0 as the color is closer to the borderline between the color gamut boundary portion and the color gamut internal portion, and come closer to E=1.0 as the color is closer to the color gamut boundary. Considering this, the color gamut boundary table 1508 used in the color gamut boundary estimation unit 1507 can also be set as follows:

$$C=\sqrt{(a^2+b^2)};$$

$$E=f(C); (0.0 \leq E \leq 1.0) \quad (16)$$

where C is the chroma value.

Alternatively, $$D=\sqrt{\{(100-L)^2+(0-a)^2+(0-b)^2\}};$$

$$E=f(D); (0.0 \le E \le 1.0) \quad (17)$$

where L, a, b=(100, 0, 0) is the white point, and D is the Euclidean distance between the white point and the color of the pixel of interest.

The matrix generation unit 1509 generates a threshold matrix corresponding to the estimation value E according to equation (12) (S303). In this case, since E=0.0, a dot concentration threshold matrix, which is the threshold matrix 1510*b* shown in FIG. 13B, is generated. Dots are therefore concentrated into a cluster.

Figure 18:
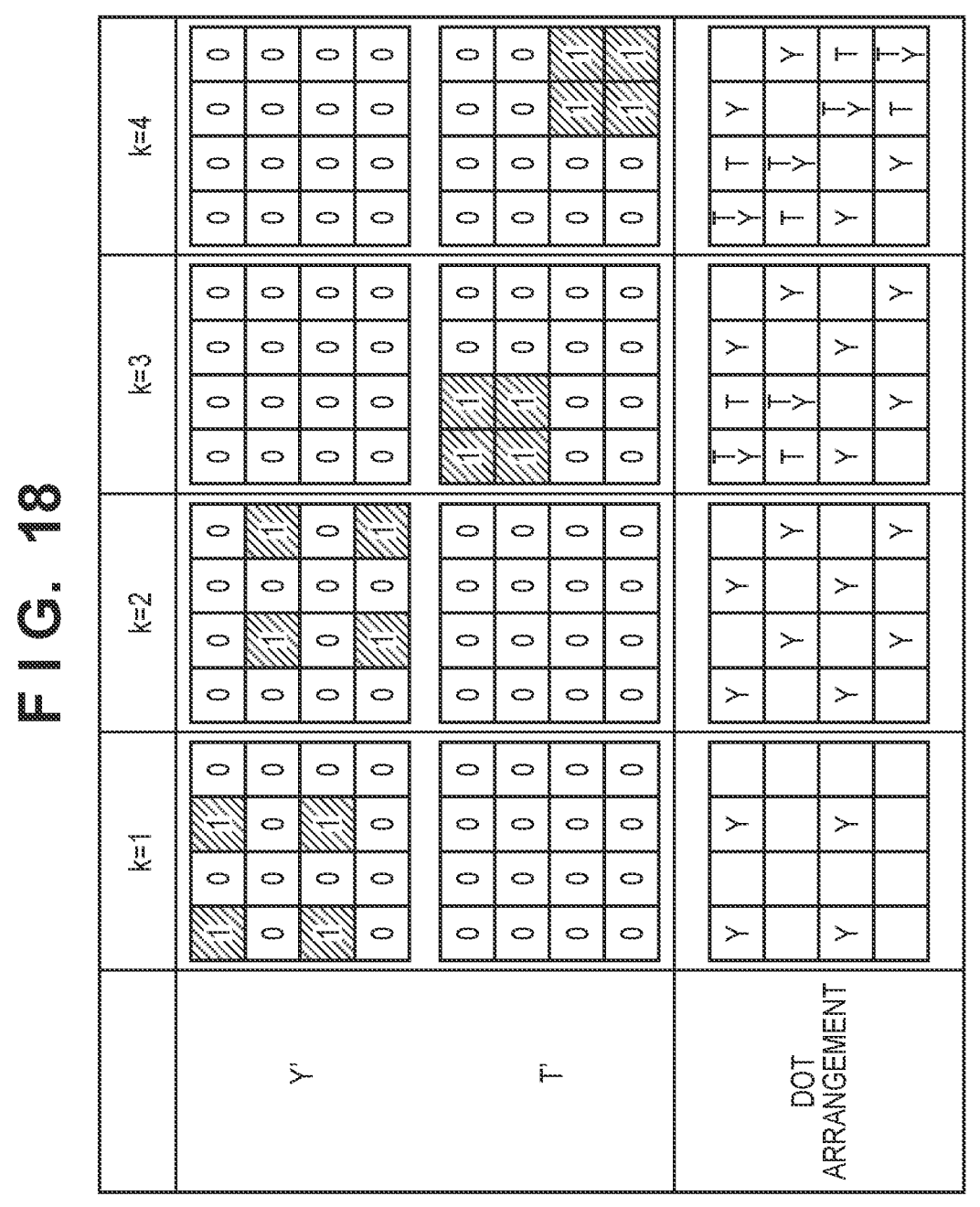

FIG. 18 shows a dot arrangement at the color gamut internal portion. Half of Y dots are formed at the scan number k=1, and all of Y dots are formed at k=2. T dots are concentratedly formed at k=3, and T dots are concentratedly formed at k=4 in a region different from the region at k=3. In the example of FIG. 18, the arrangement of T dots of the colorless material is controlled to have high concentration. FIG. 18 shows an example of the arrangement of T dots of the colorless material on yellow at L, a, b=(90, 0, 50). Hence, 50% of T dots are concentrated and formed into a cluster. As a result, the stain of specular reflection light by thin film interference comes close to be colorless.

Figure 19A:
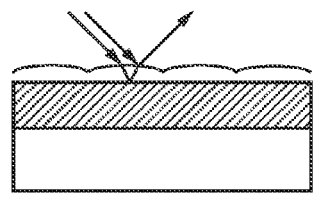
FIGS. 19A and 19B are views for explaining the fact that the stain of specular reflection light by thin film interference comes close to be colorless.
Figure 19B:
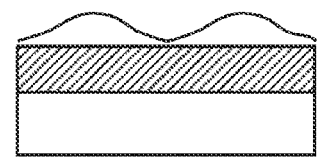

The fact that the stain of specular reflection light by thin film interference comes close to be colorless will be explained with reference to FIGS. 19A and 19B. FIG. 19A shows a state in which T dots are dispersed to form the optical thin film of the colorless material. FIG. 19B shows a state in which T dots are concentrated to increase the variation of the thickness of the colorless material. In the state of FIG. 19A, specular reflection light is stained by thin film interference. In the state of FIG. 19B, the variation of the thickness of the optical thin film is large, and stains of various colors are locally generated in specular reflection light by thin film interference. When the specular reflection light in which stains of various colors are locally generated is visually perceived, the local stains are not perceived, and the specular reflection light is perceived to be colorless because of the spatial low-pass characteristic (so-called area integration effect) of the eye. That is, if the variation of the thickness of the optical thin film of the colorless material is increased, the stain of specular reflection light by thin film interference is achromatized and visually perceived, and the image adverse effect can be reduced.

At an intermediate portion between the color gamut boundary portion and the color gamut internal portion, an intermediate threshold matrix between the dot concentration threshold matrix and the dot dispersion threshold matrix is generated, and smooth control of the intensity of thin film interference becomes possible.

Expanding of Color Gamut of Another Hue

Figure 20:
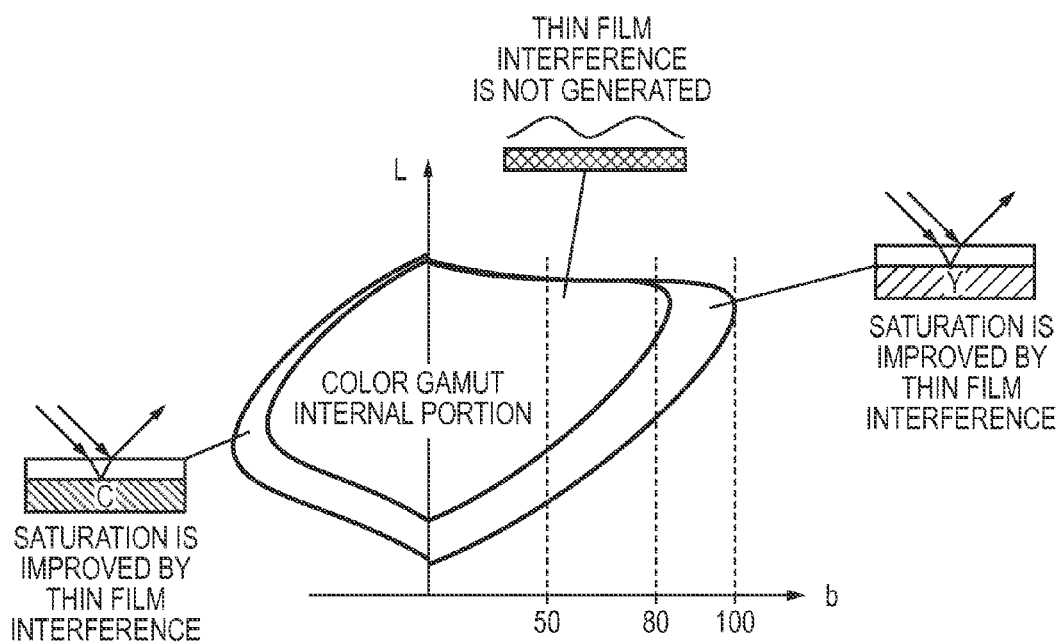
FIG. 20 is a view showing an outline of expanding of the color gamut of another hue.

Expanding of the color gamut of yellow Y has been explained above. However, expanding of the color gamut by thin film interference is similarly possible even for other hues (red R, magenta M, green G, blue B, cyan C, and green G). FIG. 20 shows an outline of expanding of the color gamut of another hue.

Since the structural color by an optical thin film changes depending on the thickness, as shown in FIGS. 16A and 16B, and 17A to 17D, the thickness d of the optical thin film of the colorless material needs to be controlled to obtain the stain of a desired hue. The thickness can be controlled based on the color separation table $T_{LUT\_3D}$ of T ink represented by equations (1). More specifically, the color material amount of T ink in which the hue of the structural color becomes equal to or approximate to the hue of a color material on a lower layer is decided experimentally, and the color separation table $T_{LUT\_3D}$ is set based on the experimental result.

Modification of Embodiments

An example has been described, in which a colorless material is superposed on a colored material by controlling the degree of dot concentration by dither processing for each recording scan, and control of recording a colorless ink after recording a colored ink. However, control equivalent to the above-described one can be achieved by performing error diffusion processing for each recording scan. In this case, control of the degree of dot concentration suffices to use a so-called output feedback error diffusion method, which is dot concentration control in the error diffusion method.

Also, a colorless material can be superposed on a colored material by using mask separation (so-called pass mask) in which a colorless ink is recorded after recording a colored ink. Further, the above-mentioned control of the degree of dot concentration is possible even by control (clustering of the pass mask) in which the dot pattern of mask separation is concentrated in accordance with color information Lab of input image data. Dot pattern clustering control by dot pattern control of mask separation is preferably implemented by, for example, a method as disclosed in Japanese Patent Laid-Open No. 2011-025658.

In this manner, a colorless material is fixed on the recording layer of a colored material. At this time, at the color gamut boundary portion, the thickness of the colorless material is controlled to obtain the hue of the structural color by thin film interference that is equal to or approximate to the hue of the colored material on the lower layer. At the color gamut internal portion, it is controlled to increase the variation of the thickness of the colorless material and achromatize the stain of specular reflection light by thin film interference. At an intermediate portion between the color gamut boundary portion and the color gamut internal portion, the variation of the thickness of the colorless material is controlled to be an intermediate thickness so as to make the borderline between the color gamut boundary portion and the color gamut internal portion less conspicuous.

Accordingly, the color gamut (color reproduction range) can be expanded using thin film interference by an optical thin film, and the image density and saturation can be improved. In addition, the color and intensity of a structural color by thin film interference can be controlled at the color gamut internal portion and color gamut boundary portion. The degree of stain of specular reflection light by thin film interference can be flexibly controlled at the color gamut internal portion, and an intermediate portion between the color gamut boundary portion and the color gamut internal portion.

[Expanding of Color Gamut in Lightness Direction]

Control of thin film interference to expand the color gamut in the saturation direction has been described above. However, control to expand the color gamut toward the color density (lightness direction) is also possible.

When superposing a colorless material on the black color material, the thickness of the colorless material is controlled at the color gamut boundary portion of the black region to minimize the amount of specular reflection light at a wavelength of 500 to 600 nm at which the luminosity function is high. Needless to say, at the color gamut internal portion, the variation of the thickness of the colorless material is increased to suppress (achromatize) the stain of specular reflection light by thin film interference. The color gamut in the density direction (lightness direction) can therefore be expanded using thin film interference by the optical thin film of the colorless material. The intensity of thin film interference is controlled between the color gamut internal portion and the color gamut boundary portion to make the borderline between the color gamut boundary portion and the color gamut internal portion less conspicuous.

Figure 21:
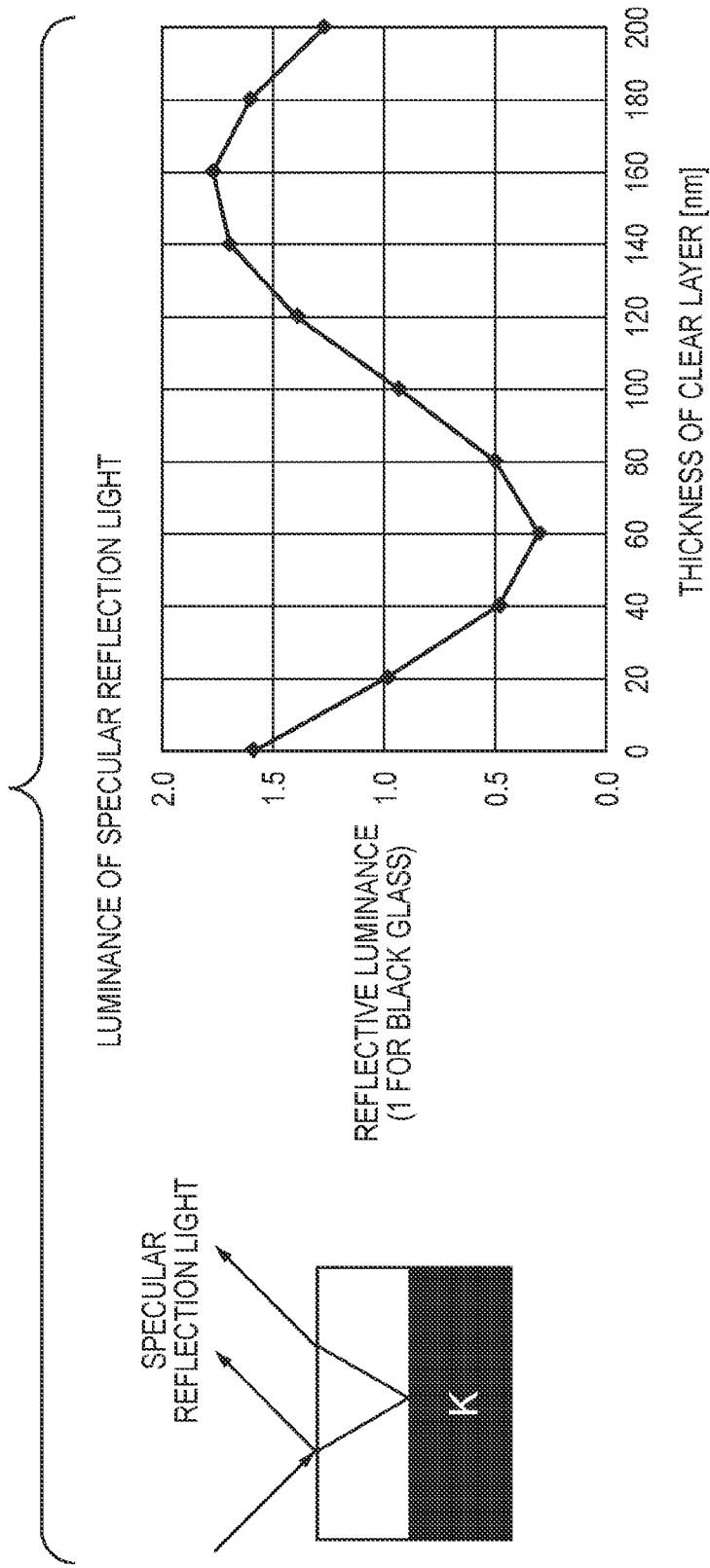
FIG. 21 is a view for explaining control to expand the color gamut in the lightness direction.

Control to expand the color gamut in the lightness direction will be explained with reference to FIG. 21. FIG. 21 shows a state in which the luminance of specular reflection light changes depending on the thickness d of a clear layer in a lamination state in which a colorless material is superposed on the K color material on the lower layer. Note that the reflective luminance of black glass is defined as 1.

As shown in FIG. 21, the reflective luminance is minimized around a thickness of 60 nm. This reveals that, to decrease the luminance of specular reflection light by thin film interference, the thickness of a colorless material is set to be around 60 nm. By reducing the luminance of specular reflection light, the color gamut in the density direction (lightness direction) can be expanded by the synergistic effect with the black color of the K color material on the lower layer.

FIGS. 22A to 22D each show the result of measuring the spectral reflectance of specular reflection light by the lamination shown in FIG. 21. The thickness d of the colorless material is 20 nm in FIG. 22A, 40 nm in FIG. 22B, 60 nm in FIG. 22C, and 80 nm in FIG. 22D. Originally, the spectral reflectance of the optical thin film is constant regardless of the thickness d. However, a measurement result in which the spectral reflectance of specular reflection light changes as the thickness d changes is obtained. This measurement result indicates that the apparent spectral reflectance changes by thin film interference. The measurement result indicates that the spectral reflectance at a wavelength of 500 to 600 nm, at which the luminosity function is high, becomes minimum especially at the thickness d=around 60 nm.

Figure 23:
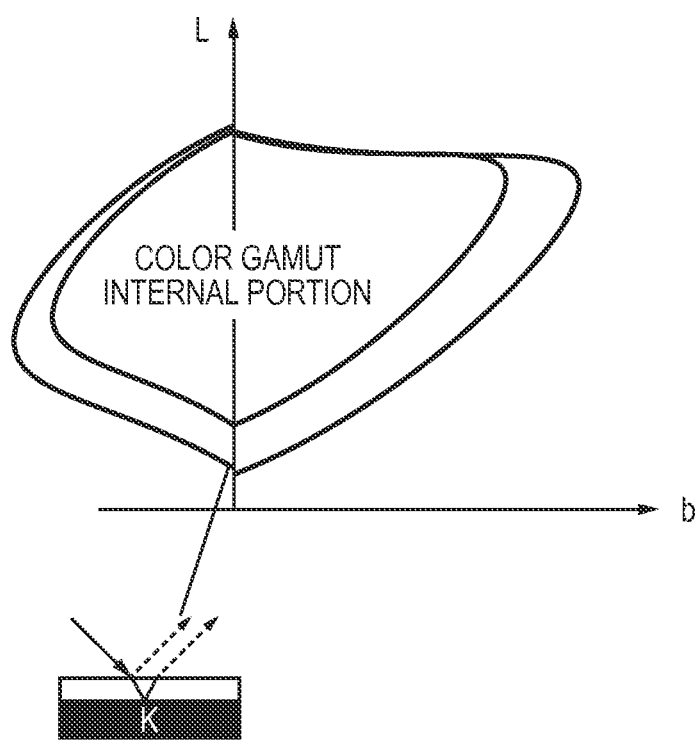
FIG. 23 is a view for explaining expanding of the color gamut in the lightness direction.

Expanding of the color gamut in the lightness direction for R, G, B=(0, 0, 0) will be explained with reference to FIG. 23. Assume that the color conversion unit 1505 converts R, G, B=(0, 0, 0) into L, a, b=(5, 0, 0) at the color gamut internal portion (S301). As shown in FIG. 23, when the colorless material is superposed on the K color material at a thickness of about 60 nm, the intensity of specular reflection light at the wavelength of 500 to 600 nm, at which the luminosity function is high, can be decreased by thin film interference, and the color gamut in the lightness direction can be expanded.

At the color gamut internal portion (gray line) of black, control of thin film interference light by an optical thin film is unnecessary. It is preferable to achromatize the stain of specular reflection light by suppressing thin film interference, as in the case in which the color gamut is expanded in the saturation direction.

[Thickness Control]

An example has been described above, in which the degree of concentration of a dot pattern is controlled to control the variation of the thickness of the optical thin film of a colorless material and control the intensity of thin film interference. However, the variation of the thickness may be controlled by a method other than the degree of concentration of a dot pattern.

For example, a recording element string Ts which discharges a colorless ink S with which the variation of the thickness is relatively small and a thin film is easily formed, and a recording element string Th which discharges a colorless ink H with which the variation of the thickness is small and a thin film is hardly formed are prepared in the printer 220. The HT processing unit 107 quantizes T data by using, for example, the dot dispersion threshold matrix 1510a, and adds, to HT data of T ink, 1-bit data representing which of the recording element string Ts and recording element string Th is used in accordance with the estimation value E. The ink color selection unit 226 controls the use of the recording element strings Is and Th by referring to the added bit.

At the color gamut boundary portion, the colorless ink S is used to obtain a desired structural color. At the color gamut internal portion, the colorless ink H is heavily used to suppress the stain of specular reflection light by thin film interference. Further, at an intermediate portion between the color gamut boundary portion and the color gamut internal portion, the colorless inks S and T are used at a ratio corresponding to the estimation value E, and a clear layer is formed using both the colorless inks S and H. Even in this case, the color gamut can be expanded at the color gamut boundary portion, and the stain of specular reflection light by thin film interference at the color gamut internal portion can be achromatized.

The above description is directed to an image processing apparatus corresponding to a printer of an inkjet recording method in which a recording head having a plurality of recording elements arrayed in a predetermined direction performs a plurality of recording scans in a direction perpendicular to the recording element array direction, and discharges ink onto a recording medium to form an image.

However, the present invention is also applicable to an image processing apparatus corresponding to a printer of a recording apparatus of another method (for example, a thermal transfer method or electrophotographic method) other than the inkjet recording method. In this case, a heating element for fusing ink, or a laser emitting element for forming the latent image of dots corresponds to a nozzle (recording element) for discharging an ink droplet.

The present invention is also applicable to, for example, a so-called full-line recording apparatus which includes a recording head having a length corresponding to the recording width of a recording medium, and records by moving a recording medium with respect to the recording head. In the full-line recording apparatus, the recording head is arranged to record a colorless ink after recording a colored ink.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-172665 filed Aug. 22, 2013 which is hereby incorporated by reference herein in its entirety.

What is claimed is:

1. An image processing apparatus for generating image data for image recording using, as recording materials, a colored material and a high transmissivity material higher in transmittance than the colored material, comprising:
- a color separation unit configured to perform color separation processing on input image data so as to generate material amount data representing a recording amount of each recording material; and
- a generation unit configured to perform halftone processing of generating binary data for each recording scan in an image recording apparatus based on the material amount data,
- wherein a discharge of the colored material in a first recording scan of recording the colored material and a discharge of the high transmissivity material in a second recording scan of recording the high transmissivity material are represented by the binary data for each recording scan,
- wherein the high transmissivity material is recorded at a predetermined thickness on a recording layer of the colored material after the first recording scan,
- wherein the generation unit comprises:
  - a setting unit configured to, in each recording material, setting recording data for each recording scan based on the material amount data and
  - a halftone processing unit configured to perform the halftone processing on the recording data for each recording scan to generate the binary data for each recording scan, wherein halftone processing of recording data of the colored material is performed using a dot dispersion threshold matrix, and halftone processing of recording data of the high transmissivity material is performed using a threshold matrix based on the color of the input image data,
- wherein the halftone processing unit comprises:
  - an estimation unit configured to calculate an estimation value representing a region of a color gamut of the image recording apparatus to which the color of the input image data belongs; and
  - a matrix generation unit configured to generate a threshold matrix by linearly coupling a dot dispersion threshold matrix and a dot concentration threshold matrix based on the estimation value, and
- wherein at least one of the color separation unit, or the generation unit is implemented using a processor.

2. The apparatus according to claim 1, wherein the color separation unit determines material amount data of the high transmissivity material based on R, G, and B values of the input image data.

3. The apparatus according to claim 2, wherein a recording layer of the high transmissivity material is recorded at a thickness corresponding to the material amount data of the high transmissivity material, and a hue of a structural color by thin film interference on the recording layer of the high transmissivity material is equal to or approximate to a hue of the colored material recorded below the recording layer of the high transmissivity material.

4. The apparatus according to claim 2, wherein a recording layer of the high transmissivity material recorded on the recording layer of the colored material for reproducing black is recorded at a thickness corresponding to the material amount data of the high transmissivity material, and an amount of light reflected by a lamination of the recording layer of the colored material and the recording layer of the high transmissivity material becomes minimum at a wavelength at which a luminosity function is high.

5. The apparatus according to claim 1, wherein, in a case where the color of the input image data corresponds to a boundary portion of a color gamut of the image recording apparatus, the halftone processing unit uses a dot dispersion threshold matrix for the halftone processing on the recording data of the high transmissivity material.

6. The apparatus according to claim 1, wherein, in a case where the color of the input image data corresponds to an internal portion of a color gamut of the image recording apparatus, the halftone processing unit uses a dot concentration threshold matrix for the halftone processing on the recording data of the high transmissivity material.

7. The apparatus according to claim 1, wherein the halftone processing unit further comprises a quantization unit configured to quantize the recording data of the high transmissivity material using the generated threshold matrix.

8. The apparatus according to claim 1, wherein the estimation unit calculates the estimation value based on chromaticity of the color of the input image data.

9. The apparatus according to claim 1, wherein the estimation unit calculates the estimation value based on a chroma value of the color of the input image data.

10. The apparatus according to claim 1, wherein the estimation unit calculates the estimation value based on the color of the input image data and a distance of a white point.

11. The apparatus according to claim 1, wherein the setting unit sets first recording data and second recording data as the recording data by looking up a table.

12. The apparatus according to claim 11, wherein the halftone processing unit performs halftone processing on the first recording data and the second recording data, and sets, as the binary data for each recording scan, a result of subtracting the first recording data having undergone the halftone processing from the second recording data having undergone the halftone processing.

13. The apparatus according to claim 1, further comprising an output unit configured to output the binary data for each recording scan to the image recording apparatus.

14. The apparatus according to claim 1, wherein the high transmissivity material comprises a recording material having a hue equal to or approximate to a hue of at least one colored material used in the image recording apparatus, and transmittance higher than transmittance of colored materials used in the image recording apparatus.

15. An image processing method of generating image data for image recording using, as recording materials, a colored material and a high transmissivity material higher in transmittance than the colored material, comprising:
using a processor to perform:
- a color separation step of performing color separation processing on input image data so as to generate material amount data representing a recording amount of each recording material; and
- a generation step of performing halftone processing of generating binary data for each recording scan in an image recording apparatus based on the material amount data,
- wherein a discharge of the colored material in a first recording scan of recording the colored material and a discharge of the high transmissivity material in a second recording scan of recording the high transmissivity material are represented by the binary data for each recording scan, and wherein the high transmissivity material is recorded at a predetermined thickness on a recording layer of the colored material after the first recording scan, wherein the generation step comprises:

a setting step of setting, in each recording material, recording data for each recording scan based on the material amount data and a halftone step of performing the halftone processing on the recording data for each recording scan to generate the binary data for each recording scan, wherein halftone processing of recording data of the colored material is performed using a dot dispersion threshold matrix, and halftone processing of recording data of the high transmissivity material is performed using a threshold matrix based on the color of the input image data, wherein the halftone step comprises:

an estimation step of calculating an estimation value representing a region of a color gamut of the image recording apparatus to which the color of the input image data belongs; and a matrix generation step of generating a threshold matrix by linearly coupling a dot dispersion threshold matrix and a dot concentration threshold matrix based on the estimation value.

16. A non-transitory computer readable medium storing a computer-executable program for causing a computer to perform the method according to claim 15.

17. An image processing apparatus for generating image data for image recording using, as recording materials, a colored material and a high transmissivity material higher in transmittance than the colored material, comprising:

a color separation unit configured to perform color separation processing on input image data so as to generate material amount data representing a recording amount of each recording material; and a generation unit configured to perform halftone processing of generating binary data for each recording scan in an image recording apparatus based on the material amount data, wherein a discharge of the colored material in a first recording scan of recording the colored material and a discharge of the high transmissivity material in a second recording scan of recording the high transmissivity material are represented by the binary data for each recording scan, wherein the high transmissivity material is recorded at a predetermined thickness on a recording layer of the colored material after the first recording scan, wherein a recording layer of the high transmissivity material is recorded at a thickness corresponding to the material amount data of the high transmissivity material, and a hue of a structural color by thin film interference on the recording layer of the high transmissivity material is equal to or approximate to a hue of the colored material recorded below the recording layer of the high transmissivity material, and wherein at least one of the color separation unit, or the generation unit is implemented using a processor.

18. An image processing method of generating image data for image recording using, as recording materials, a colored material and a high transmissivity material higher in transmittance than the colored material, comprising:

using a processor to perform steps of:

performing color separation processing on input image data so as to generate material amount data representing a recording amount of each recording material; and performing halftone processing of generating binary data for each recording scan in an image recording apparatus based on the material amount data, wherein a discharge of the colored material in a first recording scan of recording the colored material and a discharge of the high transmissivity material in a second recording scan of recording the high transmissivity material are represented by the binary data for each recording scan, and wherein the high transmissivity material is recorded at a predetermined thickness on a recording layer of the colored material after the first recording scan, wherein a recording layer of the high transmissivity material is recorded at a thickness corresponding to the material amount data of the high transmissivity material, and a hue of a structural color by thin film interference on the recording layer of the high transmissivity material is equal to or approximate to a hue of the colored material recorded below the recording layer of the high transmissivity material.

19. A non-transitory computer readable medium storing a computer-executable program for causing a computer to perform the method according to claim 18.

* * * * *